United States Patent
Muller et al.

(10) Patent No.: US 11,818,611 B2
(45) Date of Patent: Nov. 14, 2023

(54) SOURCE ACCESS NODE, TARGET ACCESS NODE AND METHODS FOR ENHANCED HANDOVER

(71) Applicant: Telefonaktiebolaget LM Ericsson (publ), Stockholm (SE)

(72) Inventors: Julien Muller, Rennes (FR); Claes-Göran Persson, Mjölby (SE); Pontus Wallentin, Linköping (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 282 days.

(21) Appl. No.: 17/427,821

(22) PCT Filed: Feb. 13, 2020

(86) PCT No.: PCT/SE2020/050156
§ 371 (c)(1),
(2) Date: Aug. 2, 2021

(87) PCT Pub. No.: WO2020/167230
PCT Pub. Date: Aug. 20, 2020

(65) Prior Publication Data
US 2022/0141736 A1    May 5, 2022

Related U.S. Application Data

(60) Provisional application No. 62/805,466, filed on Feb. 14, 2019.

(51) Int. Cl.
*H04W 36/00* (2009.01)
(52) U.S. Cl.
CPC .... *H04W 36/0079* (2018.08); *H04W 36/0011* (2013.01); *H04W 36/0016* (2013.01)

(58) Field of Classification Search
CPC ......... H04W 36/0079; H04W 36/0011; H04W 36/0016; H04W 36/18
See application file for complete search history.

(56) References Cited

U.S. PATENT DOCUMENTS

| 11,653,279 B2 * | 5/2023 | Kadiri ................... H04W 36/06 370/331 |
| 2019/0274076 A1 * | 9/2019 | Kim ................ H04W 36/00835 |

(Continued)

FOREIGN PATENT DOCUMENTS

| WO | 2018031110 A1 | 2/2018 |
| WO | WO-2020048479 A1 * | 3/2020 ............ H04W 36/18 |

OTHER PUBLICATIONS

International Search Report and Written Opinion dated Apr. 24, 2020 for International Application No. PCT/SE2020/050156 filed on Feb. 13, 2020; consisting of 15 pages.

(Continued)

*Primary Examiner* — Ahmed Elallam
(74) *Attorney, Agent, or Firm* — Christopher & Weisberg, P.A.

(57) ABSTRACT

Embodiments herein relate to, e.g., a method performed by a source access node relating to handover of a UE. The source access node sends to a target access node, an initial handover preparation message with a first explicit indicator for the target access node to request an enhanced Make-Before-Break Handover. The source access node receives an handover preparation response message from the target access node, with a second explicit indicator accepting or rejecting the requested enhanced Make-Before-Break Handover. Further, the source access node selects a possible fallback mechanism, upon reception of the handover preparation response message from the target access node indicating rejection or no support of enhanced Make-Before-Break Handover.

26 Claims, 11 Drawing Sheets

(56) References Cited

U.S. PATENT DOCUMENTS

| | | | |
|---|---|---|---|
| 2022/0124587 A1* | 4/2022 | Awada | H04W 36/0083 |
| 2022/0386204 A1* | 12/2022 | Parichehrehteroujeni | |
| | | | H04W 74/0833 |
| 2023/0034647 A1* | 2/2023 | Velev | H04W 36/0022 |

OTHER PUBLICATIONS

3GPP TSG-RAN WG2#104 Tdoc R2-1817396; Title: Enhancements to Make-Before-Break; Agenda Item: 12.3.2; Source: Ericsson; Document for: Discussion, Decision; Date and Location: Nov. 12-16, Spokane, USA; consisting of 5 pages.

3GPP TSG-RAN WG2 Meeting #105 R2-1900619; Title: Report from [104#61][LTE/feMOB] Solution directions for minimizing user data interruption for UL/DL (Nokia); Agenda item: 12.3.2; Source: Nokia, Nokia Shanghai Bell; WID/SID: LTE_feMOB—Release 16; Document for: Discussion and Decision; Date and Location: Feb. 25-Mar. 1, 2019, Athens, Greece; consisting of 49 pages.

3GPP TSG-RAN WG3 Meeting #105bis R3-195969; Title: Enhanced Make-Before-Break—Fallback mechanism; Agenda Item: 15.2.1; Source: Ericsson; Document for: Agreement; Date and Location: Oct. 14-18, 2019, Chongqing, China, consisting of 27 pages.

3GPP TS 36.300 V15.0.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description, Stage 2 (Release 15); Dec. 2017; consisting of 338 pages.

3GPP TS 38.300 V15.0.0; 3rd Generation Partnership Project; Technical Specification Group Radio Access Network; NR; NR and NG-RAN Overall Description; Stage 2 (Release 15); Dec. 2017; consisting of 68 pages.

3GPP TR 36.881 V14.0.0; 3rd Generation Partnership Project; Technical Specification Group Radio Access Network; Evolved Universal Terrestrial Radio Access (E-UTRA); Study on latency reduction techniques for LTE (Release 14); Jun. 2016; consisting of 100 pages.

3GPP TS 36.331 V15.0.0; 3rd Generation Partnership Project; Technical Specification Group Radio Access Network; Evolved Universal Terrestrial Radio Access (E-UTRA); Radio Resource Control (RRC); Protocol specification (Release 15); Dec. 2017; consisting of 776 pages.

3GPP TS 36.133 V16.0.0; 3rd Generation Partnership Project; Technical Specification Group Radio Access Network; Evolved Universal Terrestrial Radio Access (E-UTRA); Requirements for support of radio resource management (Release 16); Dec. 2018; consisting of 3,563 pages.

3GPP TS 38.423 V15.2.0; 3rd Generation Partnership Project; Technical Specification Group Radio Access Network; NG-RAN; Xn application protocol (XnAP) (Release 15); Dec. 2018; consisting of 281 pages.

3GPP TS 38.300 V15.2.0; 3rd Generation Partnership Project; Technical Specification Group Radio Access Network; NR; NR and NG-RAN Overall Description; Stage 2 (Release 15); Jun. 2018; consisting of 87 pages.

3GPP TS 38.420 V15.2.0; 3rd Generation Partnership Project; Technical Specification Group Radio Access Network; NG-RAN; Xn general aspects and principles (Release 15); Dec. 2018; consisting of 15 pages.

3GPP TS 36.300 V14.8.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14); Sep. 2018; consisting of 331 pages.

* cited by examiner

511. Send an initial Handover Preparation message to the target access node with an indicator to perform an enhanced Make Before Break Handover for a UE, including a notification of desired fallback method.

512. Receive an Handover Preparation response message from the target access node, with an indicator accepting or rejecting the enhanced Make Before Break Handover request.

513. Take a decision about the possible fallback method based upon the indicator from target access node rejecting the enhanced Make Before Break Handover

Fig. 5C

SOURCE ACCESS NODE, TARGET ACCESS NODE AND METHODS FOR ENHANCED HANDOVER

CROSS-REFERENCE TO RELATED APPLICATIONS

This application is a Submission Under 35 U.S.C. § 371 for U.S. National Stage Patent Application of International Application No.: PCT/SE2020/050156, filed Feb. 13, 2020 entitled "SOURCE ACCESS NODE, TARGET ACCESS NODE AND METHODS FOR ENHANCED HANDOVER," which claims priority to U.S. Provisional Application No. 62/805,466, filed Feb. 14, 2019, entitled "NETWORK NODE AND METHOD FOR ENHANCED HANDOVER," the entireties of both of which are incorporated herein by reference.

TECHNICAL FIELD

Embodiments herein relate to a source access node, a target access node, and methods performed therein for wireless communication. Furthermore, a computer program product and a computer readable storage medium are also provided herein. In particular, embodiments herein relate to network signalling for enhanced handover.

BACKGROUND

A Universal Mobile Telecommunications System (UMTS) is a third generation (3G) telecommunication network, which evolved from the second generation (2G) Global System for Mobile Communications (GSM). Specifications for the Evolved Packet System (EPS), also called a Fourth Generation (4G) network or Long Term Evolution (LTE), have been completed within the 3rd Generation Partnership Project (3GPP) and this work continues in the coming 3GPP releases, for example to specify a Fifth Generation (5G) New Radio (NR) network.

Consider a wireless communication system illustrated in FIG. 1. The wireless communication system may comprise one or more radio access network (RAN), where a radio access network 10, which may also be referred to as a network node, is shown with a user equipment (UE) 12, which communicates with one or multiple access nodes 13-14, using radio connections 17-18. The access nodes 13-14 are connected to a core network (CN) node 16. The access nodes 13-14 are part of radio access network 10.

For wireless communication systems pursuant to 3GPP EPS or LTE or 4G standard specifications, such as specified in 3GPP TS 36.300 v.15.0.0 and related specifications, the access nodes 13-14 corresponds typically to an Evolved NodeB (eNB) and the core network node 16 corresponds typically to either a Mobility Management Entity (MME) and/or a Serving Gateway (SGVV). The eNB is part of the radio access network 10, which in this case is the Evolved Universal Terrestrial Radio Access Network (E-UTRAN), while the MME and SGW are both part of the Evolved Packet Core network (EPC).

For wireless communication systems pursuant to 3GPP 5G System (5GS) also referred to 5G NR standard specifications, such as specified in 3GPP TS 38.300 v 15.0.0 and related specifications, on the other hand, the access nodes 13-14 correspond typically to 5G NodeBs, denoted as gNBs, and the core network node 16 corresponds typically to either a Access and Mobility Management Function (AMF) node and/or a User Plane Function (UPF) node. A gNB is part of the radio access network 10, which in this case is the Next Generation Radio Access Network (NG-RAN), while the AMF and UPF are both part of the 5G Core Network (5GC).

To support fast mobility between NR and LTE and avoid change of core network, LTE access nodes, denoted as eNBs, may also be connected to the 5G-CN via interfaces NG-U and/or NG-C and support the Xn interface. An eNB connected to 5GC is called a next generation eNB (ng-eNB) and is considered part of the NG-RAN. LTE connected to 5GC will not be discussed further in this document; however, it should be noted that most of the solutions and features described for LTE and NR in this document also apply to LTE connected to 5GC. In this document, when the term LTE is used without further specification it refers to LTE-EPC.

Mobility in RRC_CONNECTED in LTE and NR.

Mobility in RRC_CONNECTED state is also known as handover. The purpose of a handover is to move the UE 12, due to e.g. mobility, from a source access node 13, using a source radio connection 17, to a target access node 14, using a target radio connection 18. The target radio connection 18 is associated with a target cell controlled by the target access node 14. So in other words, during a handover, the UE 12 moves from a source cell to the target cell.

In some cases, the source access node 13 and target access node 14 are different nodes, such as different eNBs or gNBs. These cases are referred to as inter-node handover, inter-eNB handover or inter-gNB handover. In other cases, the source access node 13 and target access node 14 are the same node, such as the same eNB and gNB. These cases are referred to as intra-node handover, intra-eNB handover or intra-gNB handover and cover the case when source and target cells are controlled by the same radio access node. In yet other cases, handover is performed within the same cell, and thus also within the same access node controlling that cell. These cases are referred to as intra-cell handover.

It should therefore be understood that the source access node 13 and target access node 14 refers to a role served by a given access node during a handover of a specific UE. For example, a given radio access node may serve as source access node during handover of one UE, while it also serves as the target access node during handover of a different UE. And, in case of an intra-node or intra-cell handover of a given UE, the same radio access node serves both as the source access node and target access node for that UE.

An RRC_CONNECTED UE in E-UTRAN or NG-RAN can be configured by the network to perform measurements of serving and neighbor cells and based on the measurement reports sent by the UE, the network may decide to perform a handover of the UE to a neighbor cell. The network then sends a Handover Command message to the UE, for example, in LTE an RRCConnectionReconfiguration message with a field called mobilityControlInformation and in NR an RRCReconfiguration message with a reconfigurationWithSync field.

These reconfigurations are actually prepared by the target access node upon a request from the source access node over X2 or S1 interface in case of EUTRA-EPC or Xn or NG interface in case of NG-RAN-5GC, and takes into account the existing radio resource control (RRC) configuration the UE has with source access node, which are provided in the inter-node request. The reconfiguration parameters provided by the target access node contains, for example, information needed by the UE to access the target access node, e.g., random access configuration, a new Cell Radio Network Temporary Identifier (C-RNTI) assigned by the target access node and security parameters enabling the UE to calculate new security keys associated to the target access node so the UE can send a Handover Complete message on signalling radio bearer (SRB1), encrypted and integrity protected, based on new security keys upon accessing the target access node.

FIG. 2 shows a signaling flow between UE, source access node 13, also known as source gNB or source cell, and target access node 14, also known as target gNB or target cell, during a handover procedure, using 5G/NR as example.

Although the signaling flow in FIG. 2 shows a handover scenario in 5G/NR, there are some general and common principles for UEs performing handover or in more general terms, mobility in RRC_CONNECTED in LTE and NR:

Mobility in RRC_CONNECTED is Network-controlled as the network has best information regarding current situation such as load conditions, resources in different nodes, available frequencies, etc. Network can also take into account the impact from other UEs served by the network, e.g. from a resource allocation perspective.

Network prepares a target cell controlled by a target access node 14 before the UE accesses that access node. Source access node 13 provides the UE with the RRC configuration to be used in the target cell, including signalling radio bearer 1 (SRB1) configuration to be used by the UE when sending the handover (HO) Complete message in the target cell.

The UE is provided by the target access node with a new C-RNTI. The UE 12 identifies itself by conveying the C-RNTI in message 3 (MSG3) in the HO Complete message. Hence, there is no context fetching between target access node and source access node, unless a failure occurs.

To speed up the handover, network provides the UE 12 with information how to access the target access node e.g. random access channel (RACH) configuration, so the UE 12 does not have to acquire system information (SI) prior to the handover.

UE may be provided with contention-free random access (CFRA) resources, i.e. in that case the target access node 14 identifies the UE from the preamble in MSG1. The principle is that the handover procedure can always be optimized with network pre-allocated resources.

Security is prepared before the UE accesses the target cell controlled by the target access node i.e. keys must be refreshed before sending the encrypted and integrity protected HO Complete message, in LTE the RRC Connection Reconfiguration Complete message, so that the UE can be verified by the target access node.

Both full and delta reconfiguration are supported so that the HO command can be minimized.

Make-Before-Break Rel-14:

Handover interruption time is typically defined as the time from the UE 12 stops transmission and/or reception with the source access node 13 (such as a eNB or gNB) until the target access node 14 (such as a eNB or gNB) resumes transmission/reception with the UE 12.

In LTE pre-Rel-14, according to 3GPP TR 36.881 v 14.0.0, the handover interruption time is at least 45 ms. In LTE and NR, different solutions to decrease the handover interruption time have since then been discussed. Improvements are driven for example by new service requirements on low latency e.g. aerial, industrial automation, industrial control, for which low interruption time shall be guaranteed.

As an example of one such improvement, Make-Before-Break (MBB) was introduced in LTE Rel-14 in purpose to shorten handover interruption time as close to 0 ms as possible. FIG. 3 shows signaling for Make-before-break in LTE Rel-14.

The MBB handover procedure as introduced in LTE Rel-14, refers to a handover mechanism where the UE connects to the target cell before disconnecting from the source cell unlike the standard handover procedure where the UE resets media access control (MAC) and re-establishes Packet Data Convergence Protocol (PDCP) upon receiving the HO Command message, RRCConnectionReconfiguration message with mobilityControlInfo, in the source cell. The mobilityControlInfo in the RRCConnectionReconfiguration message includes an information element (IE) makeBeforeBreak, to instruct the UE to keep the connection to the source cell. From 3GPP TS 36.331 v.15.0.0:

MakeBeforeBreak (MBB) Information Element (IE)

This information element indicates that the UE shall continue uplink transmission and/or downlink reception with the source cell(s) before performing the first transmission through physical random access channel (PRACH) to the target intra-frequency primary cell (PCell), or performing initial physical uplink shared channel (PUSCH) transmission to the target intra-frequency PCell while rach-Skip is configured.

NOTE 1a: It is up to UE implementation when to stop the uplink transmission and/or downlink reception with the source cell(s) to initiate re-tuning for connection to the target cell, as specified in TS 36.133 v16.0.0, if makeBeforeBreak is configured.

In the MBB solution, the connection to the source cell is maintained after the reception of RRCConnectionReconfiguration message, with the makeBeforeBreak IE present in the mobilityControlInfo, until the UE executes initial uplink transmission in the target cell, i.e. MAC and PDCP reset is delayed in the UE until the UE performs random-access in the target cell. It is up to UE implementation when to stop the uplink transmission/downlink reception with the source cell to initiate re-tuning for connection to the target cell.

MBB as specified in LTE Rel-14 v.14.0.0 (3GPP TS 36.300 and TS 36.331) has some known limitations: Even if MBB and other improvements, such as RACH-less handover are combined it is still not possible to reach ~0 ms handover interruption time. MBB in Rel-14 is designed for UEs with single transmit and receive (Tx/Rx) chain which means that MBB in practice only supports intra-frequency handover. In an intra-frequency handover scenario, a single Rx UE is capable of receiving DL data from both target and source cell, however, a single Tx UE will not be able to transmit to both cells simultaneously. Thus, in MBB Rel-14, the UE will release the connection to the source cell at the first UL transmission. This occurs when the UE transmits the RACH preamble; or transmits the HO Complete message, if RACH-less HO is configured.

Consequently, the UE releases the connection with the source cell before the connection with the target cell is ready for packet transmission and/or reception.

Enhanced Make-Before-Break.

Two new work items for mobility enhancements in LTE and NR have started in 3GPP in release 16. The main objectives of the work items are to improve the robustness at handover and to further decrease the interruption time at handover.

Improvements to the LTE Rel-14 make-before-break handover have been proposed in the past. Some of these improvements would benefit from UEs with dual Tx/Rx radio chain, such a UE has dual radio transmitters and receivers and associated dual user plane protocol stacks. One example of such proposed improvement for LTE Rel-16 is shown in FIG. 4.

The key steps to support 0 ms HO interruption time by means of Enhanced MBB procedure are as follows:

Step 4: Source eNB sends Handover Command i.e. RCConnectionReconfiguration message with mobifityControlInfo to the UE, containing an indicator e.g. enhanced MBB indicator to perform 0 ms HO interruption.

Step 5: Source eNB starts forwarding DL PDCP packets to the target eNB and continues to send and receive PDCP packets to/from the UE (step 7). DL PDCP packets forwarded from source eNB are buffered in the target eNB.

Step 6: UE starts synchronizing with the target cell, while keeping its connection with the source cell.

Step 7: Packet data is still sent and received via the source cell.

Step 8: UE performs random-access in the target cell and target eNB schedules uplink resources.

Step 9: UE sends RRCConnectionReconfigurationComplete message in the target cell. The target eNB can now start sending PDCP packets to the UE, while at the same time, the source eNB may continue to send PDCP packets to the UE. From this point in time the UE only sends UL data via the target cell. In purpose to assist the target eNB with PDCP duplication check, the UE may convey a PDCP Status Report in the RRCConnectionReconfigurationComplete message. Based on the information in the PDCP Status Report, the target eNB will only send PDCP packets to the UE that were not received by the UE in the source cell.

Step 10: The UE distinguishes PDCP packets received from source and target cell.

Step 11: Source eNB sends an sequence number (SN) Status Transfer message to the target eNB when the transmission/reception to/from the UE has ended, indicating the uplink/downlink PDCP SN receiver/transmitter status.

Step 12: UE detaches from source cell when the connection procedure to the target cell is completed.

Step 13: Target eNB informs source eNB to release UE Context. 3GPP discussions to decrease the handover interruption time based on e.g. the enhanced make-before-break for LTE, including additional actions needed from the target access node, are currently ongoing for LTE and NR.

Inter-node messages for mobility.

RRC Inter-node messages.

During mobility, such as handover, from a source access node to a target access node, such as a source gNB to a target gNB, or a source eNB to a target eNB, in NR and LTE, two inter-node messages are typically used: HandoverPreparationInformation and HandoverCommand. When the source access node decides to handover the UE, the source access node provides the target access node with some information in the HandoverPreparationInformation that enables the target access node to prepare an RRCReconfiguration, provided in the HandoverCommand, to be used by the UE when accessing the target cell upon handover execution. Definitions from TS 38.331 v.15.0.0 are shown below:

HandoverPreparationInformation.

This message is used to transfer the NR RRC information used by the target gNB during handover preparation, including UE capability information.

Direction: source gNB/source RAN to target gNB.

| HandoverPreparationInformation message |
|---|

```
-- ASN1START
-- TAG-HANDOVER-PREPARATION-INFORMATION-START
HandoverPreparationInformation ::=       SEQUENCE {
    criticalExtensions                   CHOICE {
        c1                               CHOICE {
            handoverPreparationInformation   HandoverPreparationInformation-IEs,
            spare3 NULL, spare2 NULL, spare1 NULL
        },
        criticalExtensionsFuture         SEQUENCE { }
    }
}
HandoverPreparationInformation-IEs ::=   SEQUENCE {
    ue-CapabilityRAT-List                UE-CapabilityRAT-ContainerList,
    sourceConfig                         AS-Config OPTIONAL, -- Cond HO
    rrm-Config                           RRM-Config OPTIONAL,
    as-Context                           AS-Context OPTIONAL,
    nonCriticalExtension                 SEQUENCE { } OPTIONAL
}
AS-Config ::=                            SEQUENCE {
    rrcReconfiguration                   OCTET STRING (CONTAINING RRCReconfiguration),
    ...
}
AS-Context ::=                           SEQUENCE {
    reestablishmentInfo                  ReestablishmentInfo OPTIONAL,
    configRestrictInfo                   ConfigRestrictInfoSCG
OPTIONAL,
    ...,
    [[ ran-NotificationAreaInfo          RAN-NotificationAreaInfo OPTIONAL
    ]]
}
ReestablishmentInfo ::=                  SEQUENCE {
    sourcePhysCellId                     PhysCellId,
    targetCellShortMAC-I                 ShortMAC-I,
    additionalReestabInfoList            ReestabNCellInfoList
OPTIONAL
}
```

| HandoverPreparationInformation message |
|---|
| ReestabNCellInfoList : :=     SEQUENCE ( SIZE (1..maxCellPrep) ) OF ReestabNCellInfo<br>ReestabNCellInfo: :=     SEQUENCE {<br>  cellIdentity     CellIdentity,<br>  key-gNodeB-Star     BIT STRING (SIZE (256) ),<br>  shortMAC-I     ShortMAC-I<br>}<br>RRM-Config : :=     SEQUENCE {<br>  ue-InactiveTime     ENUMERATED {<br>    s1, s2, s3, s5, s7, s10, s15, s20,<br>    s25, s30, s40, s50, min1, min1s20c, min1s40,<br>    min2, min2s30, min3, min3s30, min4, min5, min6,<br>    min7, min8, min9, min10, min12, min14, min17, min20,<br>    min24, min28, min33, min38, min44, min50, hr1,<br>    hr1min30, hr2, hr2min30, hr3, hr3min30, hr4 hr5, hr6,<br>    hr8, hr10, hr13, hr16, hr20, day1, day1hr12, day2,<br>    day2hr12, day3, day4, day5, day7, day10, day14, day19,<br>    day24, day30, dayMoreThan30} OPTIONAL,<br>  candidateCellInfoList     MeasResultList2NR OPTIONAL,<br>  ...<br>}<br>-- TAG-HANDOVER-PREPARATION-INFORMATION-STOP<br>-- ASN1STOP |

| HandoverPreparationInformation field descriptions |
|---|
| as-Context<br>Local RAN context required by the target gNB.<br>sourceConfig<br>The radio resource configuration as used in the source cell.<br>rrm-Config<br>Local RAN context used mainly for RRM purposes.<br>ue-CapabilityRAT-List<br>The UE radio access related capabilities concerning RATs supported by the UE. FFS whether certain capabilities are mandatory to provide by source e.g. of target and/or source RAT. |

| Conditional<br>Presence | Explanation |
|---|---|
| HO | The field is mandatory present in case of handover within NR; The field is optionally present in case of handover from E-UTRA connected to 5GC; otherwise the field is not present. |

NOTE 2:
The following table indicates per source RAT whether RAT capabilities are included or not.

| Source RAT | NR capabilities | E-UTRA capabilities | MR-DC capabilities |
|---|---|---|---|
| NR | Included | May be included | May be included |
| E-UTRAN | Included | May be included | May be included |

| RRM-Config field descriptions |
|---|
| candidateCellInfoList<br>A list of the best cells on each frequency for which measurement information was available |

HandoverCommand

This message is used to transfer the handover command as generated by the target gNB.

Direction: target gNB to source gNB/source RAN.

| HandoverCommand message |
|---|
| -- ASN1START<br>-- TAG-HANDOVER-COMMAND-START<br>HandoverCommand ::=     SEQUENCE {<br>  criticalExtensions     CHOICE {<br>    c1     CHOICE{<br>      handoverCommand     HandoverCommand-IEs,<br>      spare3 NULL, spare2 NULL, spare1 NULL<br>    },<br>    criticalExtensionsFuture     SEQUENCE { }<br>  }<br>}<br>HandoverCommand-IEs ::=     SEQUENCE {<br>  handoverCommandMessage     OCTET STRING (CONTAINING RRCReconfiguration),<br>  nonCriticalExtension     SEQUENCE { }     OPTIONAL<br>}<br>-- TAG-HANDOVER-COMMAND-STOP<br>-- ASN1STOP |

Xn inter-node messages for handover/DC-setup.

According to TS 38.420 v.15.2.0, there is a function called "Handover preparation function" defined as follows:

Handover Preparation Function

This function allows the exchange of information between source and target NG-RAN nodes in order to initiate the handover of a certain UE to the target.

Another function that is relevant is the "Handover cancelling function" defined as follows:

Handover Cancellation Function

This function allows informing an already prepared target NG-RAN node that a prepared handover will not take place. It allows releasing the resources allocated during a handover preparation function.

In TS 38.423 v.15.2.0 these functions are described in more details, see sections 8.2.1 and 8.2.3.

The existing solution, i.e. for release-14 Make-Before-Break, does not imply special actions from the target access node, compared to legacy handover. In enhanced Make-Before-Break the target access node needs to understand that the source access node is requesting an enhanced Make-Before-Break handover in order to take a decision, i.e. reject or accept, and start the required actions, which in some cases are different for enhanced Make-before-break compared to other types of handover, such as Rel-14 Make-before-break. An example of such an action is the transmission of SN Status Transfer from the source access node. Also, in some cases, such as in case of different vendors, or different software versions, the target access node does not support enhanced Make-before-break, even if the source access node does.

SUMMARY

As part of developing embodiments herein the following has been identified. The source access node does not signal the desired fallback mechanism to be used in case the target access node rejects the enhanced Make-Before-Break request. This may result in additional delay for the UE to be handed over to a new node, i.e. the source node may need to start a new Handover procedure towards the same or another target node.

If the target access node rejects the enhanced Make-Before-Break request, it cannot choose a handover fallback mechanism, e.g. to a legacy handover, which could avoid additional delay for the UE to be handed over to a new node.

If the target access node does not support enhanced Make-Before-Break, the source access node may not know it, and therefore it may start to send DL packets to an already detached UE. For the source access node to know whether the target access node supports enhanced MBB or not, the source access node need to read the content of the MobilityControlInfo included in the transparent container, e.g. included in the HANDOVER REQUEST ACKNOWLEDGE message, prepared by the target access node.

If the target access node rejects or does not support enhanced Make-Before-Break, the source access node needs to start a new Handover Preparation, which results in additional delay for the UE to be handed over to a new node.

If the target access node rejects or does not support enhanced Make-Before-Break (eMBB), the source access node may not make the difference between the two, i.e. eMBB not supported or eMBB temporary rejected, and therefore could continue sending requests to a node not supporting this feature. In order to avoid this behavior, the source access node needs to be configured with all the possible target access nodes capabilities.

It is therefore an object of embodiments herein to provide an improved method for handling handover of a UE.

According to embodiments herein, the object may be achieved by providing a method performed by a source access node relating to handover of a UE. The source access node sends to a target access node, an initial handover preparation message with a first explicit indicator for the target access node to request an enhanced Make-Before-Break Handover. The source access node receives an handover preparation response message from the target access node, with a second explicit indicator accepting or rejecting the requested enhanced Make-Before-Break Handover. Further, the source access node selects a possible fallback mechanism, upon reception of the handover preparation response message from the target access node indicating rejection or no support of enhanced Make-Before-Break Handover. E.g. it is herein disclosed a method performed in the source access node taking a decision to perform an enhanced Make-Before-Break Handover for a UE, preparing a target access node, and acting upon a response message from the target access node, the method may comprise: sending an initial Handover Preparation message with an explicit indicator for the target access node to request an enhanced Make-Before-Break Handover; notifying the target access node of the desired fallback in case of failure or reject of the enhanced Make-Before-Break Handover request; receiving and processing an Handover Preparation response message from the target access node, with an explicit indicator accepting or rejecting the enhanced Make-Before-Break Handover request; learning the target enhanced Make-Before-Break capability from the target response message to the enhanced Make-Before-Break Handover request; and selecting a possible fallback mechanism, i.e. handover alternative, upon reception of the target access node rejecting or not supporting enhanced Make-Before-Break Handover.

According to embodiments herein, the object may be achieved by providing a method performed by a target access node relating to handover of a UE, from a source access node to the target access node. The target access node receives an initial handover preparation message with a first explicit indicator from the source access node requesting an enhanced Make-Before-Break Handover; and responds to the initial handover preparation message sent by the source access node, with a handover preparation response message with a second explicit indicator accepting or rejecting the enhanced Make-Before-Break Handover request. E.g. the target access node may perform a method taking a decision to accept or reject an enhanced Make-Before-Break Handover request for a UE and informing the source access node. The method may comprise: receiving and processing an initial Handover Preparation message with an explicit indicator from the source access node requesting an enhanced Make-Before-Break Handover; responding to an initial Handover Preparation message sent by the source access node, with an explicit indicator accepting or rejecting the enhanced Make-Before-Break Handover request; selecting a possible fallback mechanism in case of rejection of the enhanced Make-Before-Break Handover; notifying the source access node of the desired fallback mechanism in case of rejection of the enhanced Make-Before-Break Handover request; and inserting an explicit enhanced Make-Before-Break Handover indicator in the RRC Handover-Command message transferred to the source, in order to notify the UE.

It is furthermore provided herein a computer program product comprising instructions, which, when executed on at least one processor, cause the at least one processor to carry out the method above, as performed by the source access node or the target access node, respectively. It is additionally provided herein a computer-readable storage medium, having stored thereon a computer program product comprising instructions which, when executed on at least one processor, cause the at least one processor to carry out the method according to the method above, as performed by the source access node or the target access node, respectively.

The object may be achieved by providing a source access node for handling handover of a UE. The source access node is configured to send to a target access node, an initial handover preparation message with a first explicit indicator for the target access node to request an enhanced Make-Before-Break Handover. The source access node is further configured to receive an handover preparation response message from the target access node, with a second explicit indicator accepting or rejecting the requested enhanced Make-Before-Break Handover; and to select a possible fallback mechanism, upon reception of the handover preparation response message from the target access node indicating rejection or no support of enhanced Make-Before-Break Handover.

Compared to the prior art i.e. existing procedure for legacy handover as described in background or release-14 Make-Before-Break handover, advantages of the solution according to embodiments described below is that the source access node may:
 for example, learn the target access node capability of eMBB without prior capability exchange or configuration;
 for example, signal to the target access node a desired fallback mechanism to use if eMBB is not supported or is to be rejected by the target node;
 for example, be informed that the target access node does not support eMBB and therefore not send DL packets to an already detached UE;
 for example, if the target access node does not support eMBB, be informed that a legacy handover is prepared by the target access node, and by that avoid starting a new Handover procedure.

The object may be achieved by providing a target access node for handling handover of a UE, from a source access node to the target access node. The target access node is configured to receive an initial handover preparation message with a first explicit indicator from the source access node requesting an enhanced Make-Before-Break Handover; and to respond to the initial handover preparation message sent by the source access node, with a handover preparation response message with a second explicit indicator accepting or rejecting the enhanced Make-Before-Break Handover request.

Compared to the prior art i.e. existing procedure for legacy handover or release-14 Make-Before-Break, advantages of the solution according to embodiments described below is that the target access node may:
 for example, take an informed decision about accepting or rejecting the eMBB request and start the required actions;
 for example, signal to the source access node the acceptance of the eMBB request;
 for example, signal to the source access node the rejection of the eMBB request, together with e.g. a chosen fallback mechanism.

These actions according to embodiments herein as described above will result in an optimized eMBB procedure which avoids unnecessary capability configurations between nodes; avoids additional handover delay caused by failure or rejection of a handover request; and avoids discrepancies in behaviour between UE, source and target access nodes. Therefore embodiments herein provide an improved method for handling handover of a UE.

BRIEF DESCRIPTION OF THE DRAWINGS

Examples of embodiments herein are described in more detail with reference to attached drawings in which:
FIG. 5C is a flow chart illustrating a method performed in a source access node according to one embodiment herein.

DETAILED DESCRIPTION

Intra-RAT (within same RAT), inter-RAT (between different RAT), NG-RAN, E-UTRAN and further disclaimers:
Most of the network and UE actions defined in embodiments herein are described as being performed in NG-RAN or E-UTRAN. In all these different flavors, the source access node and the target access node for which enhanced Make-Before-Break (eMBB) may be prepared may each be:
 An E-UTRAN node, i.e. an eNodeB; An NG-RAN node, i.e. a gNodeB supporting NR; or a ng-eNodeB supporting LTE.

Then, the inter-node procedures described in embodiments herein may be between two eNodeBs, two gNodeBs, two ng-eNodeBs or any two RAN nodes from the same RAT or different RATs. Hence, they may be implemented in the XnAP protocol, in the case of NG-RAN nodes connected to 5GC, or X2AP protocol or both.

In other words, the discussions regarding the inter-node procedures and messages may be any of the following:
 Inter-node intra-RAT intra-system, such as gNodeBs over Xn;
 Inter-node intra-RAT intra-system, such as ng-eNodeBs over Xn;
 Inter-node intra-RAT intra-system, such as eNodeBs over X2;
 Inter-node inter-RAT intra-system, such as ng-eNodeBs and gNodeBs over Xn;
 Inter-node inter-RAT inter-system, such as E-UTRAN and NG-RAN, i.e. gNodeBs/en-eNodeBs and eNodeBs over NG and S1.

In addition, the procedures also describe solutions involving messages between RAN nodes and core network nodes over NG and S1 interface and between core network nodes from different systems, i.e. between EPC and 5GC, over the N26 interface.

Figure 5A:
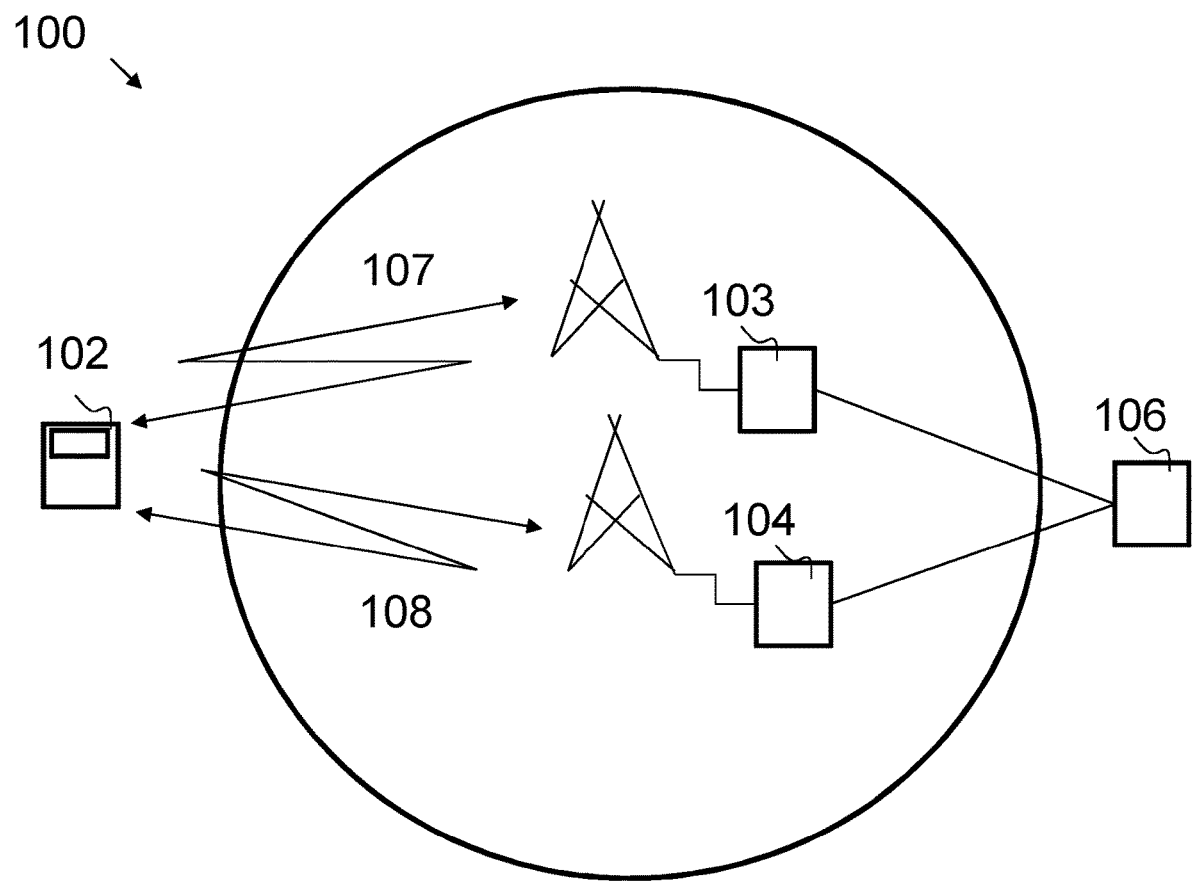
FIG. 5A illustrates a wireless communication network in which embodiments herein may be implemented.

A wireless communication system according to embodiments herein is illustrated in FIG. 5A. The wireless communication system may comprise one or more radio access network (RAN), where a radio access network 100 is shown with a user equipment (UE) 102, which communicates with one or multiple access nodes 103-104, using radio connections 107-108. The access nodes 103-104 are connected to a core network (CN) node 106. The access nodes 103-104 are part of the radio access network 100. A source access node 103 and a target access node 104. Embodiments herein relate to eMBB handover of the UE 102 from the source access node 103 to the target access node 104.

The method actions performed by the source access node 103 for handling HO of the UE 102 in the communication network 1 according to embodiments will now be described with reference to a flowchart depicted in FIG. 5B. The actions do not have to be taken in the order stated below, but may be taken in any suitable order. Actions performed in some embodiments are marked with dashed boxes.

Action 501. The source access node 103 sends to the target access node 104, the initial handover preparation message, e.g. a handover request, with a first explicit indicator for the target access node 104 to request eMBB handover. The first explicit indication may be added as an additional information in the initial handover preparation message sent from the source access node 103 to the target access node 104. The first explicit indicator may be included in an radio resource control (RRC) context signaled from the source access node 103 to the target access node 104. The first explicit indicator may be added in a handover request message.

Action 502. The source access node 103 then receives a handover preparation response message from the target access node 104, with a second explicit indicator accepting or rejecting the requested eMBB handover.

Action 503. The source access node 103 may learn, from the handover preparation response message, a capability of the target access node 104 related to enhanced Make-Before-Break handover. The capability of the target access node 104 may be learned based on successful responses or failure responses of requested enhanced Make-Before-Break handovers.

Action 504. The source access node 103 may further notify the target access node 104 of a desired fallback in case of failure or reject of the requested enhanced Make-Before-Break Handover. It should be noted that the first explicit indicator for Enhanced Make-Before-Break handover and an indicator for the desired fallback mechanism may be combined in a single Information Element in the initial Handover Preparation message in action 501.

Action 505. The source access node 103 may receive a notification from the target access node 104 of a selected possible fallback mechanism in case of rejection of the enhanced Make-Before-Break Handover request.

Action 506. The source access node 103 then selects a possible fallback mechanism, upon reception of the handover preparation response message from the target access node 104 indicating rejection or no support of eMBB Handover. The source access node 103 may select the possible fallback mechanism by taking the desired fallback into account and/or the learned capability of the target access node 104. E.g. the source access node 103 may take the desired fallback into account, which desired fallback may be based on the learned capability of the target access node 104. The possible and/or the desired fallback may comprise one or more of the following: a fallback to legacy handover; a fallback to release-14 MBB handover; and a rejection of the handover request. The source access node 103 may select the possible fallback mechanism by taking the notification from the target access node 104 of a selected possible fallback into account. Thus, embodiments herein may disclose that in response to receiving the Handover Preparation response message, the source access node 103 may take a decision, based on the Handover Preparation response message, about the possible fallback method upon reception of the target access node 104 rejecting eMBB.

Methods according to embodiments herein for enhanced handover will be described in detail in the following.

I. Source Access Node 103 Signalling in Initial Handover Preparation Message:

According to an exemplified embodiment herein, a method performed in the source access node 103 will be described with reference to FIG. 5C. The method comprises the following actions or steps, which actions may be performed in any suitable order.

Action 511. The source access node 103 sends the initial Handover Preparation message with the first explicit indicator, e.g. Enhanced Make-Before-Break Indicator, for the target access node 104 to request an enhanced Make-Before-Break Handover.

In one implementation the first explicit indicator may be added as an additional information in the initial Handover Preparation message sent from source to target.

In another implementation the first explicit indicator may be included in the RRC Context signaled from source to target.

An example of a possible implementation of the first alternative above, taking XnAP (3GPP TS 38.423 v15.0.0) HANDOVER REQUEST message as baseline is shown below indicated by the underlined text:

9.1.1.1 Handover Request

This message is sent by the source NG-RAN node to the target NG-RAN node to request the preparation of resources for a handover.

Direction: source NG-RAN node→target NG-RAN node

| IE/Group Name | Presence | Range | IE type and reference | Semantics description |
|---|---|---|---|---|
| Message Type | M | | 9.2.3.1 | |
| Source NG-RAN node UE XnAP ID reference | M | | NG-RAN node UE XnAP ID 9.2.3.16 | Allocated at the source NG-RAN node |

| IE/Group Name | Presence | Range | IE type and reference | Semantics description |
|---|---|---|---|---|
| Cause | M | | 9.2.3.2 | |
| Target Cell Global ID | M | | 9.2.3.25 | Includes either an E-UTRA CGI or an NR CGI |
| GUAMI | M | | 9.2.3.24 | |
| UE Context Information | | 1 | | |
| >NG-C UE associated Signalling reference | M | | AMF UE NGAP ID 9.2.3.26 | Allocated at the AMF on the source NG-C connection. |
| >Signalling TNL association address at source NG-C side | M | | CP Transport Layer Information 9.2.3.31 | This IE indicates the AMF's IP address of the SCTP association used at the source NG-C interface instance. |
| >UE Security Capabilities | M | | 9.2.3.49 | |
| >AS Security Information | M | | 9.2.3.50 | |
| >Index to RAT/Frequency Selection Priority | O | | 9.2.3.23 | |
| >UE Aggregate Maximum Bit Rate | M | | 9.2.3.17 | |
| >PDU Session Resources To Be Setup List | | 1 | 9.2.1.1 | Similar to NG-C signalling, containing UL tunnel information per PDU Session Resource; and in addition, the source side QoS flow ⇔ DRB mapping |
| >RRC Context | M | | OCTET STRING | Either includes the HandoverPreparationInformation message as defined in subclause 10.2.2. of TS 36.331 [14], if the target NG-RAN node is an ng-eNB, or the HandoverPreparationInformation message as defined in subclause 11.2.2 of TS 38.331 [10], if the target NG-RAN node is a gNB. |
| >Location Reporting Information | O | | 9.2.3.47 | Includes the necessary parameters for location reporting. |
| >Mobility Restriction List | O | | 9.2.3.53 | |
| Trace Activation | O | | 9.2.3.55 | |
| Masked IMEISV | O | | 9.2.3.32 | |
| UE History Information | M | | 9.2.3.64 | |
| UE Context Reference at the S-NG-RAN node | O | | | |
| >Global NG-RAN Node ID | M | | 9.2.2.3 | |
| >S-NG-RAN node UE XnAP ID | M | | NG-RAN node UE XnAP ID 9.2.3.16 | |
| Enhanced Make-Before-Break Indicator | O | | ENUMERATED (eMBB required, . . .) | |

In one embodiment, the source access node 103 may notify the target access node 104 of a desired fallback in case the target access node 104 rejects the enhanced Make-Before-Break Handover (eMBB) request.

In one embodiment, the source access node 103 may take a decision about the desired fallback mechanism if the target access node 104 rejects the enhanced Make-Before-Break request. This decision may be based on e.g. measurements, quality of service (QoS), UE capabilities, network capabilities, subscription, etc. An example of the possible fallback methods are listed below:

Fallback to legacy handover;

Fallback to release-14 MBB handover;

Reject the Handover Request.

In another embodiment, the source access node 103 may inform the target access node 104 of the desired fallback mechanism, via e.g. additional information in the initial Handover Preparation message.

In another embodiment, the indicator for Enhanced Make-Before-Break i.e. the first explicit indicator, and the indicator for desired fallback mechanism may be combined in a single Information Element in the initial Handover Preparation message.

An example of a possible implementation of source access node 103 informing the target access node 104, in an "IE Enhanced Make-Before-Break Information", of desired fallback mechanism together with the acceptance of the Enhanced Make-Before-Break request, taking XnAP (3GPP TS 38.423 v.15.0.0) HANDOVER REQUEST message as baseline, is shown below indicated by the underlined text:

9.1.1.1 Handover Request

This message is sent by the source NG-RAN node to the target NG-RAN node to request the preparation of resources for a handover.

Direction: source NG-RAN node→target NG-RAN node.

| IE/Group Name | Presence | Range | IE type and reference | Semantics description |
|---|---|---|---|---|
| Message Type | M | | 9.2.3.1 | |
| Source NG-RAN node UE XnAP ID reference | M | | NG-RAN node UE XnAP ID 9.2.3.16 | Allocated at the source NG-RAN node |
| Cause | M | | 9.2.3.2 | |
| Target Cell Global ID | M | | 9.2.3.25 | Includes either an E-UTRA CGI or an NR CGI |
| GUAMI | M | | 9.2.3.24 | |
| UE Context Information | | 1 | | |
| >NG-C UE associated Signalling reference | M | | AMF UE NGAP ID 9.2.3.26 | Allocated at the AMF on the source NG-C connection. |
| Signalling TNL association address at source NG-C side | M | | CP Transport Layer Information 9.2.3.31 | This IE indicates the AMF's IP address of the SCTP association used at the source NG-C interface instance. |
| >UE Security Capabilities | M | | 9.2.3.49 | |
| >AS Security Information | M | | 9.2.3.50 | |
| >Index to RAT/Frequency Selection Priority | O | | 9.2.3.23 | |
| >UE Aggregate Maximum Bit Rate | M | | 9.2.3.17 | |
| >PDU Session Resources To Be Setup List | | 1 | 9.2.1.1 | Similar to NG-C signalling, containing UL tunnel information per PDU Session Resource; and in addition, the source side QoS flow ⇔ DRB mapping |
| >RRC Context | M | | OCTET STRING | Either includes the HandoverPreparationInformation message as defined in subclause 10.2.2. of TS 36.331 [14], if the target NG-RAN node is an ng-eNB, or the HandoverPreparationInformation message as defined in subclause 11.2.2 of TS 38.331 [10], if the target NG-RAN node is a gNB. |
| >Location Reporting Information | O | | 9.2.3.47 | Includes the necessary parameters for location reporting. |
| >Mobility Restriction List | O | | 9.2.3.53 | |
| Trace Activation | O | | 9.2.3.55 | |
| Masked IMEISV | O | | 9.2.3.32 | |
| UE History Information | M | | 9.2.3.64 | |
| UE Context Reference at the S-NG-RAN node | O | | | |
| >Global NG-RAN Node ID | M | | 9.2.2.3 | |
| >S-NG-RAN node UE XnAP ID | M | | NG-RAN node UE XnAP ID 9.2.3.16 | |
| Enhanced Make-Before-Break Information | O | | | |
| > Enhanced Make-Before-Break Information | M | | ENUMERATED (eMBB required, . . .) | |
| > Desired fallback method | O | | ENUMERATED (legacy HO, rel14 MBB, reject, . . .) | |

Action 512. The source access node 103 receives and processes a Handover Preparation response message from the target access node 104, with an explicit indicator, the second explicit indicator, accepting or rejecting the enhanced Make-Before-Break Handover request.

Action 513. In one embodiment, the source access node 103 may take the decision about the possible fallback method as described in Action 506, after receiving the target access node response to the initial Handover Preparation message. In that case the source access node 103 may make a choice between:

Accepting the fallback method suggested by the target access node 104;

Cancelling the handover procedure, e.g. using HANDOVER CANCEL message, and starting a new Handover procedure, with the same node, e.g. without eMBB indicator or with a different node.

Figure 6A:
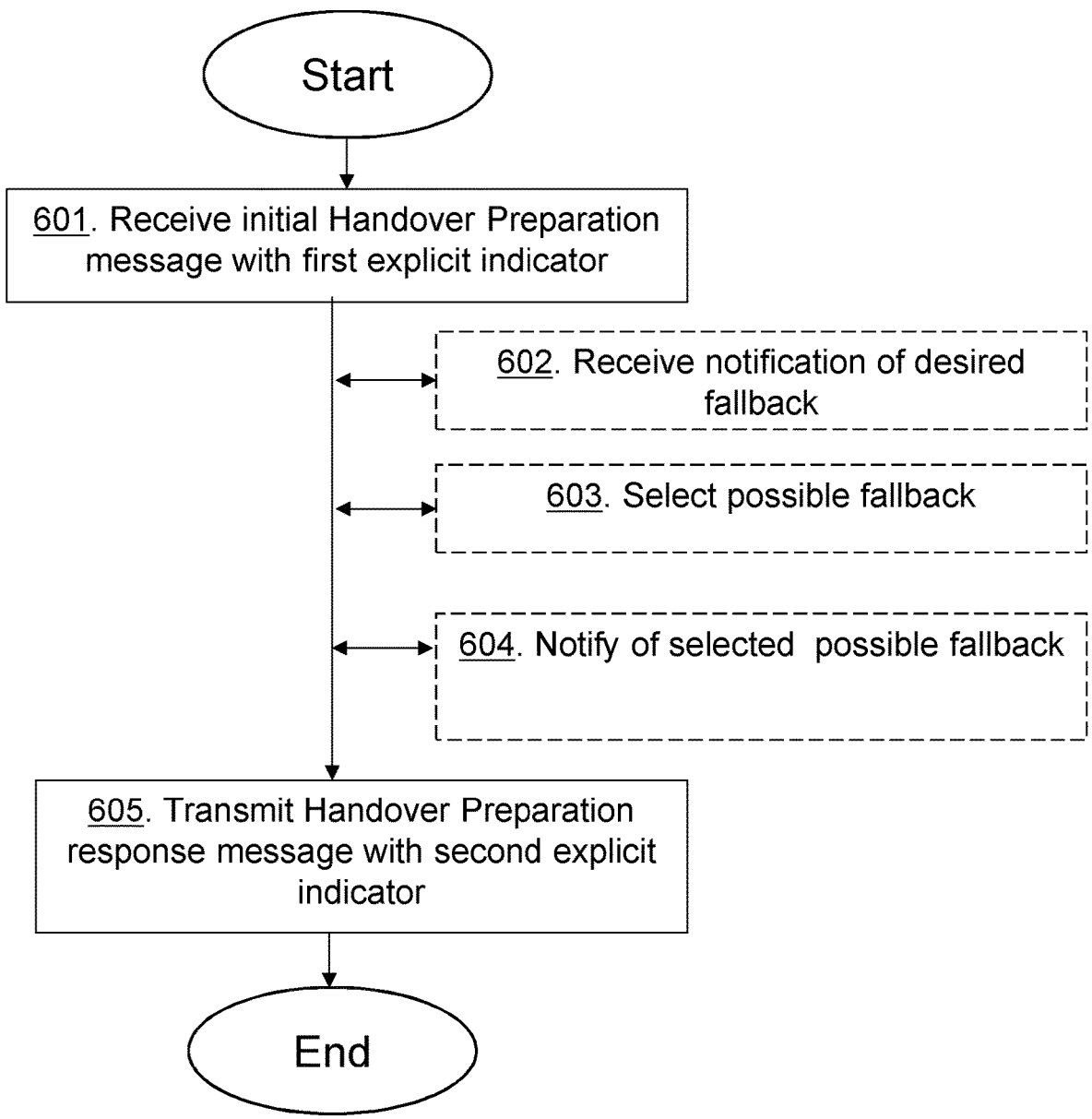
FIG. 6A is a flow chart illustrating a method performed in a target access node according to another embodiment herein.

The method actions performed by the target access node 104 handling handover of the UE from the source access node 103 to the target access node 104 according to embodiments herein will now be described with reference to a flowchart depicted in FIG. 6A. The actions do not have to be taken in the order stated below, but may be taken in any suitable order. Actions performed in some embodiments are marked with dashed boxes.

Action 601. The target access node 104 receives the initial handover preparation message with the first explicit indicator from the source access node 103 requesting an enhanced Make-Before-Break Handover.

Action 602. The target access node 104 may receive the notification from the source access node 103 of a desired fallback in case of failure or reject of the requested enhanced Make-Before-Break Handover.

Action 603. The target access node 104 may further select the possible fallback mechanism in case of failure or rejection of the enhanced Make-Before-Break Handover. E.g. selection of fallback solution in the target access node 104 may be based on the desired fallback included in the handover preparation message.

Action 604. The target access node 104 may then notify the source access node 103 of the selected possible fallback mechanism in case of failure or rejection of the enhanced Make-Before-Break Handover request.

Action 605. The target access node 104 responds to the initial handover preparation message sent by the source access node 103, with the handover preparation response message with the second explicit indicator accepting or rejecting the enhanced Make-Before-Break Handover request. The target access node 104 may respond with a handover preparation response message to the source access node 103 with the second indicator rejecting the enhanced Make Before Break Handover request and an indicator of selected possible fallback method. The target access node 104 may respond by inserting an explicit enhanced Make-Before-Break Handover indicator in the RRC Handover-Command message transferred to the source access node 103. The target access node 104 may select the possible fallback mechanism by taking the received notification from the source access node 103 of the desired fallback into account.

II. Handover Preparation Response from the Target Access Node 104.

Figure 6B:
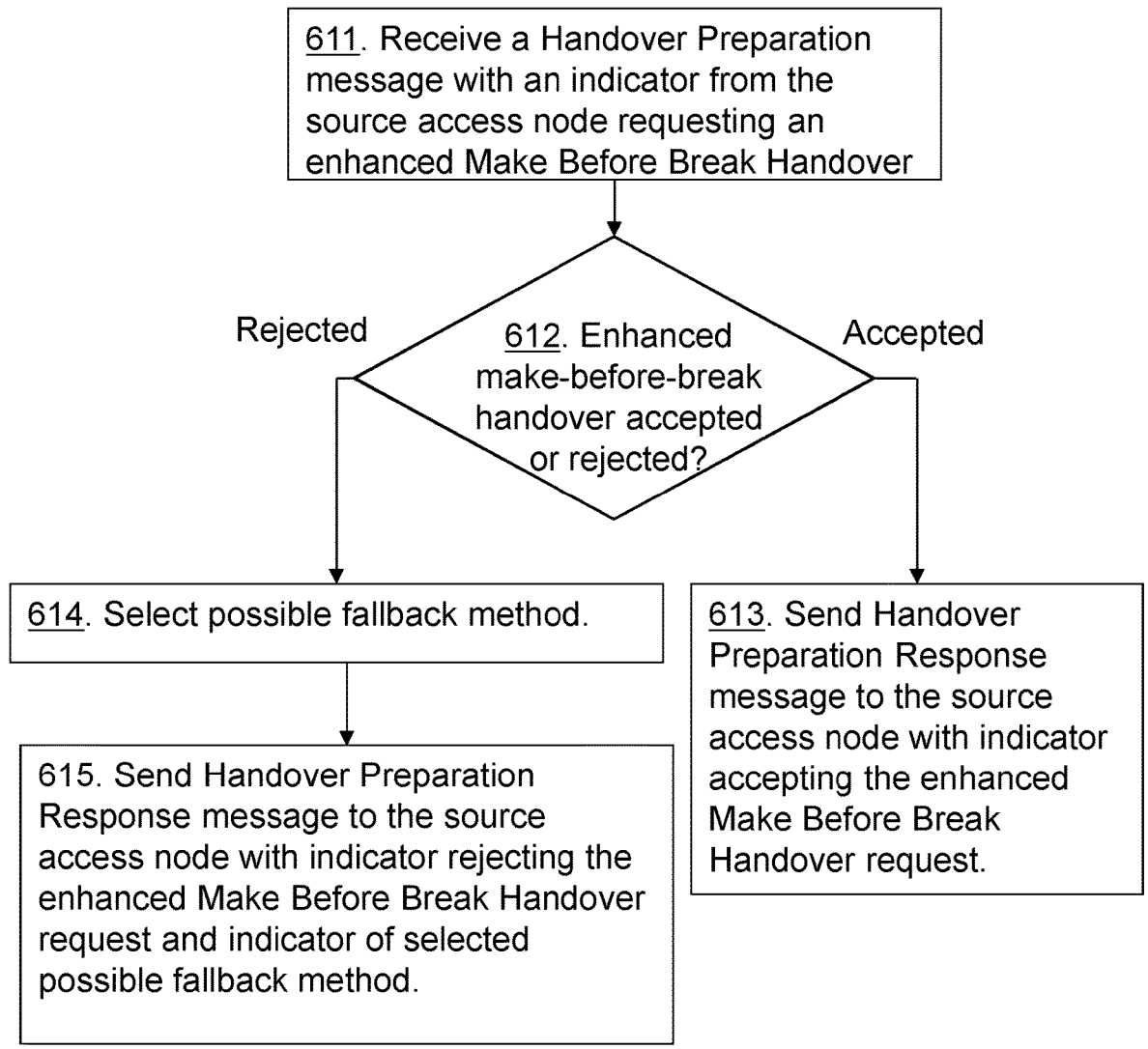
FIG. 6B is a flow chart illustrating a method performed in a target access node according to another embodiment herein.

According to one exemplified embodiment herein, a method performed in the target access node 104 will be described with reference to FIG. 6B. The method comprises the following actions or steps, which actions may be performed in any suitable order.

Action 611. The target access node 104 receives and processes the initial Handover Preparation message with the explicit indicator, i.e. the first explicit indicator, from the source access node 103 requesting an enhanced Make-Before-Break Handover.

Action 612. The target access node 104 may then take a decision about the enhanced Make-Before-Break request, e.g. accept, fallback or reject. This decision may be based on e.g. QoS, network capabilities, available resources, configuration, etc. . . . The target access node's decision may be as follows:

Enhanced Make-Before-Break handover accepted;
Fallback to legacy handover;
Fallback to rel-14 Make-Before-Break handover;
Handover rejected.

Action 613. If the target access node 104 accepts the eMBB handover, it sends Handover Preparation Response message to the source access node 103 with the second explicit indicator accepting the enhanced Make Before Break Handover request.

The target access node 104 may inform the source access node 103 of its decision concerning the enhanced Make-Before-Break request via e.g. additional information in the Handover Preparation response message.

For successful or partial success, e.g. when fallback mechanism is used, an example of a possible implementation taking XnAP (3GPP TS 38.423 v.15.0.0) HANDOVER REQUEST ACKNOWLEDGE message as baseline, adding an IE "Enhanced Make-Before-Break indicator" as indicated with underlined text:

9.1.1.2 Handover Request Acknowledge

This message is sent by the target NG-RAN node to inform the source NG-RAN node about the prepared resources at the target.

Direction: target NG-RAN node→source NG-RAN node.

| IE/Group Name | Presence | Range | IE type and reference | Semantics description |
|---|---|---|---|---|
| Message Type | M | | 9.2.3.1 | |
| Source NG-RAN node UE XnAP ID | M | | NG-RAN node UE XnAP ID 9.2.3.16 | Allocated at the source NG-RAN node |
| Target NG-RAN node UE XnAP ID | M | | NG-RAN node UE XnAP ID 9.2.3.16 | Allocated at the target NG-RAN node |
| PDU Session Resources Admitted List | M | | 9.2.1.2 | |
| PDU Session Resources Not Admitted List | O | | 9.2.1.3 | |
| Target NG-RAN node To Source NG-RAN node Transparent Container | M | | OCTET STRING | Either includes the HandoverCommand message as defined in subclause 10.2.2 of TS 36.331 [14], if the target NG-RAN node is an ng-eNB, or the HandoverCommand message as defined in subclause 11.2.2 of TS 38.331 [10], if the target NG-RAN node is a gNB. |

-continued

| IE/Group Name | Presence | Range | IE type and reference | Semantics description |
|---|---|---|---|---|
| UE Context Kept Indicator | O | | 9.2.3.68 | |
| Criticality Diagnostics | O | | 9.2.3.3 | |
| Enhanced Make-Before-Break indicator | O | | ENUMERATED (eMBB accepted, fallback to legacy HO, fallback to rel14 MBB) | |

Action 614. If the target access node 104 rejects the eMBB handover, the target access node 104 may select a possible fallback method.

For handover failure, e.g. when the target access node 104 rejects the HO and no fallback method is used, an example of a possible implementation may be taking XnAP (3GPP TS 38.423 v.15.0.0) HANDOVER PREPARATION FAILURE message as baseline and using a new cause value eMBB rejected as indicated with underlined text:

9.1.1.3 Handover Preparation Failure

This message is sent by the target NG-RAN node to inform the source NG-RAN node that the Handover Preparation has failed.

Direction: target NG-RAN node→source NG-RAN node.

| IE/Group Name | Presence | Range | IE type and reference | Semantics description |
|---|---|---|---|---|
| Message Type | M | | 9.2.3.1 | |
| Source NG-RAN node UE XnAP ID | M | | NG-RAN node UE XnAP ID 9.2.3.16 | Allocated at the source NG-RAN node |
| Cause | M | | 9.2.3.2 | |
| Criticality Diagnostics | O | | 9.2.3.3 | |

9.2.3.2 Cause

The purpose of the Cause IE is to indicate the reason for a particular event for the XnAP protocol.

| IE/Group Name | Presence | Range | IE Type and Reference | Semantics Description |
|---|---|---|---|---|
| CHOICE Cause Group | M | | | |
| >Radio Network Layer | | | | |
| >>Radio Network Layer Cause | M | | ENUMERATED (Cell not Available, Handover Desirable for Radio Reasons, Handover Target not Allowed, Invalid AMF Set ID, No Radio Resources Available in Target Cell, Partial Handover, Reduce Load in Serving Cell, Resource Optimisation Handover, Time Critical Handover, $TXn_{RELOCoverall}$ Expiry, $TXn_{RELOCprep}$ Expiry, Unknown GUAMI ID, Unknown Local NG-RAN node UE XnAP ID, Inconsistent Remote NG-RAN node UE XnAP ID, Encryption And/Or Integrity Protection Algorithms Not Supported, Protection Algorithms Not Supported, Multiple PDU Session ID Instances, Unknown PDU Session ID, Unknown QoS Flow ID, Multiple QoS Flow ID Instances, Switch Off Ongoing, Not supported 5QI value, $TXn_{DCoverall}$ Expiry, $TXn_{DCprep}$ Expiry, Action Desirable for Radio Reasons, | |

| IE/Group Name | Presence | Range | IE Type and Reference | Semantics Description |
|---|---|---|---|---|
| | | | Reduce Load, Resource Optimisation, Time Critical action, Target not Allowed, No Radio Resources Available, Invalid QoS combination, Encryption Algorithms Not Supported, Procedure cancelled, RRM purpose, Improve User Bit Rate, User Inactivity, Radio Connection With UE Lost, Failure in the Radio Interface Procedure, Bearer Option not Supported, UP integrity protection not possible, UP confidentiality protection not possible, Resources not available for the slice(s), UE Maximum integrity protected data rate reason, CP Integrity Protection Failure, UP Integrity Protection Failure, Slice not supported by NG-RAN, MN Mobility, SN Mobility, Count reaches max value, Unknown Old NG-RAN node UE XnAP ID, PDCP Overload, DRB ID not available, eMBB rejected, Unspecified, . . .) | |
| >Transport Layer | | | | |
| >>Transport Layer Cause | M | | ENUMERATED (Transport Resource Unavailable, Unspecified, . . .) | |
| >Protocol | | | | |
| >>Protocol Cause | M | | ENUMERATED (Transfer Syntax Error, Abstract Syntax Error (Reject), Abstract Syntax Error (Ignore and Notify), Message not Compatible with Receiver State, Semantic Error, Abstract Syntax Error (Falsely Constructed Message), Unspecified, . . .) | |
| >Misc | | | | |
| >>Miscellaneous Cause | M | | ENUMERATED (Control Processing Overload, Hardware Failure, O&M Intervention, Not enough User Plane Processing Resources, Unspecified, . . .) | |

The meaning of the different cause values is specified in the following table. In general, "not supported" cause values indicate that the related capability is missing. On the other hand, "not available" cause values indicate that the related capability is present, but insufficient resources were available to perform the requested action.

| Radio Network Layer cause | Meaning |
|---|---|
| Cell not Available | The concerned cell is not available. |
| Handover Desirable for Radio Reasons | The reason for requesting handover is radio related. |
| Handover Target not Allowed | Handover to the indicated target cell is not allowed for the UE in question. |
| Invalid AMF Set ID | The target NG-RAN node doesn't belong to the same AMF Set of the source NG-RAN node, i.e. NG handovers should be attempted instead. |
| No Radio Resources Available in Target Cell | The target cell doesn't have sufficient radio resources available. |
| Partial Handover | Provides a reason for the handover cancellation. The target NG-RAN node did not admit all PDU Sessions included in the HANDOVER REQUEST and the source NG-RAN node |

-continued

| Radio Network Layer cause | Meaning |
| --- | --- |
| | estimated service continuity for the UE would be better by not proceeding with handover towards this particular target NG-RAN node. |
| Reduce Load in Serving Cell | Load in serving cell needs to be reduced. When applied to handover preparation, it indicates the handover is triggered due to load balancing. |
| Resource Optimisation Handover | The reason for requesting handover is to improve the load distribution with the neighbour cells. |
| Time Critical Handover | Handover is requested for time critical reason i.e. this cause value is reserved to represent all critical cases where the connection is likely to be dropped if handover is not performed. |
| $TXn_{RELOCoverall}$ Expiry | The reason for the action is expiry of timer $TXn_{RELOCoverall}$. |
| $TXn_{RELOCprep}$ Expiry | Handover Preparation procedure is cancelled when timer $TXn_{RELOCprep}$ expires. |
| Unknown GUAMI ID | The target NG-RAN node belongs to the same AMF Set of the source NG-RAN node and recognizes the AMF Set ID. However, the GUAMI value is unknown to the target NG-RAN node. |
| Unknown Local NG-RAN node UE XnAP ID | The action failed because the receiving NG-RAN node does not recognise the local NG-RAN node UE XnAP ID. |
| Inconsistent Remote NG-RAN node UE XnAP ID | The action failed because the receiving NG-RAN node considers that the received remote NG-RAN node UE XnAP ID is inconsistent.. |
| Encryption And/Or Integrity Protection Algorithms Not Supported | The target NG-RAN node is unable to support any of the encryption and/or integrity protection algorithms supported by the UE. |
| Multiple PDU Session ID Instances | The action failed because multiple instances of the same PDU Session had been provided to the NG-RAN node. |
| Unknown PDU Session ID | The action failed because the PDU Session ID is unknown in the NG-RAN node. |
| Unknown QoS Flow ID | The action failed because the QoS Flow ID is unknown in the NG-RAN node. |
| Multiple QoS Flow ID Instances | The action failed because multiple instances of the same QoS flow had been provided to the NG-RAN node. |
| Switch Off Ongoing | The reason for the action is an ongoing switch off i.e. the concerned cell will be switched off after offloading and not be available. It aides the receiving NG-RAN node in taking subsequent actions, e.g. selecting the target cell for subsequent handovers. |
| Not supported 5QI value | The action failed because the requested 5QI is not supported. |
| $TXn_{DCoverall}$ Expiry | The reason for the action is expiry of timer $TXn_{DCoverall}$. |
| $TXn_{DCprep}$ Expiry | The reason for the action is expiry of timer $TXn_{DCprep}$ |
| Action Desirable for Radio Reasons | The reason for requesting the action is radio related. In the current version of this specification applicable for Dual Connectivity only. |
| Reduce Load | Load in the cell(group) served by the requesting node needs to be reduced. In the current version of this specification applicable for Dual Connectivity only. |
| Resource Optimisation | The reason for requesting this action is to improve the load distribution with the neighbour cells. In the current version of this specification applicable for Dual Connectivity only. |
| Time Critical action | The action is requested for time critical reason i.e. this cause value is reserved to represent all critical cases where radio resources are likely to be dropped if the requested action is not performed. In the current version of this specification applicable for Dual Connectivity only. |
| Target not Allowed | Requested action towards the indicated target cell is not allowed for the UE in question. In the current version of this specification applicable for Dual Connectivity only. |
| No Radio Resources Available | The cell(s) in the requested node don't have sufficient radio resources available. In the current version of this specification applicable for Dual Connectivity only. |
| Invalid QoS combination | The action was failed because of invalid QoS combination. In the current version of this specification applicable for Dual Connectivity only. |

-continued

| Radio Network Layer cause | Meaning |
| --- | --- |
| Encryption Algorithms Not Supported | The requested NG-RAN node is unable to support any of the encryption algorithms supported by the UE.<br>In the current version of this specification applicable for Dual Connectivity only. |
| Procedure cancelled | The sending node cancelled the procedure due to other urgent actions to be performed.<br>In the current version of this specification applicable for Dual Connectivity only. |
| RRM purpose | The procedure is initiated due to node internal RRM purposes.<br>In the current version of this specification applicable for Dual Connectivity only. |
| Improve User Bit Rate | The reason for requesting this action is to improve the user bit rate.<br>In the current version of this specification applicable for Dual Connectivity only. |
| User Inactivity | The action is requested due to user inactivity on all PDU Sessions. The action may be performed on several levels:<br>on UE Context level, if NG is requested to be released in order to optimise the radio resources; or S-NG-RAN node didn't see activity on the PDU session recently.<br>on PDU Session Resource or DRB or QoS flow level, e.g. if Activity Notification indicate lack of activity<br>In the current version of this specification applicable for Dual Connectivity only. |
| Radio Connection With UE Lost | The action is requested due to losing the radio connection to the UE.<br>In the current version of this specification applicable for Dual Connectivity only. |
| Failure in the Radio Interface Procedure | Radio interface procedure has failed.<br>In the current version of this specification applicable for Dual Connectivity only. |
| Bearer Option not Supported | The requested bearer option is not supported by the sending node.<br>In the current version of this specification applicable for Dual Connectivity only. |
| UP integrity protection not possible | The PDU session cannot be accepted according to the required user plane integrity protection policy. |
| UP confidentiality protection not possible | The PDU session cannot be accepted according to the required user plane confidentiality protection policy. |
| Resources not available for the slice(s) | The requested resources are not available for the slice(s). |
| UE Maximum integrity protected data rate reason | The request is not accepted in order to comply with the maximum data rate for integrity protection supported by the UE. |
| CP Integrity Protection Failure | The request is not accepted due to failed control plane integrity protection. |
| UP Integrity Protection Failure | The procedure is initiated because the SN (hosting node) detected an Integrity Protection failure in the UL PDU coming from the MN. |
| Slice not supported by NG-RAN | The PDU session cannot be accepted because the slice is not supported by the NG-RAN node. |
| MN Mobility | The procedure is initiated due to relocation of the M-NG-RAN node UE context. |
| SN Mobility | The procedure is initiated due to relocation of the S-NG-RAN node UE context. |
| Count reaches max value, | Indicates the PDCP COUNT for UL or DL reached the max value and the bearer may be released. |
| Unknown Old NG-RAN node UE XnAP ID | The action failed because the Old NG-RAN node UE XnAP ID or the S-NG-RAN node UE XnAP ID is unknown. |
| PDCP Overload | The procedure is initiated due to PDCP resource limitation. |
| DRB ID not available | The action failed because the M-NG-RAN node is not able to provide additional DRB IDs to the S-NG-RAN node. |
| eMBB rejected | The action failed because the enhanced Make-Before-Break request has been rejected. |
| Unspecified | Sent for radio network layer cause when none of the specified cause values applies. |

| Transport Layer cause | Meaning |
| --- | --- |
| Unspecified | Sent when none of the above cause values applies but still the cause is Transport Network Layer related. |

| NAS cause | Meaning |
| --- | --- |
| Unspecified | Sent when none of the above cause values applies but still the cause is NAS related. |

| Protocol cause | Meaning |
|---|---|
| Transfer Syntax Error | The received message included a transfer syntax error. |
| Abstract Syntax Error (Reject) | The received message included an abstract syntax error and the concerning criticality indicated "reject". |
| Abstract Syntax Error (Ignore And Notify) | The received message included an abstract syntax error and the concerning criticality indicated "ignore and notify". |
| Message Not Compatible With Receiver State | The received message was not compatible with the receiver state. |
| Semantic Error | The received message included a semantic error. |
| Abstract Syntax Error (Falsely Constructed Message) | The received message contained IEs or IE groups in wrong order or with too many occurrences. |
| Unspecified | Sent when none of the above cause values applies but still the cause is Protocol related. |

| Miscellaneous cause | Meaning |
|---|---|
| Control Processing Overload | NG-RAN node control processing overload. |
| Hardware Failure | NG-RAN node hardware failure. |
| Not enough User Plane Processing Resources | NG-RAN node has insufficient user plane processing resources available. |
| O&M Intervention | Operation and Maintenance intervention related to NG-RAN node equipment. |
| Unspecified | Sent when none of the above cause values applies and the cause is not related to any of the categories Radio Network Layer, Transport Network Layer or Protocol. |

Action 615. In one embodiment, the target access node 104 sends Handover Preparation Response message to the source access node 103 with the second explicit indicator rejecting the enhanced Make Before Break Handover request and an indicator of selected possible fallback method.

In one embodiment, the target access node 104 not supporting eMBB may send an Handover Request Failure with an existing cause value, e.g. Abstract Syntax Error (Reject).

In one embodiment, the source access node 103 receives and may process the above Handover Preparation response message from the target access node 104, with the second explicit indicator accepting or rejecting the enhanced Make-Before-Break Handover request.

III. Target Access Node eMBB Capability Learning in the Source Access Node 103.

Figure 5B:
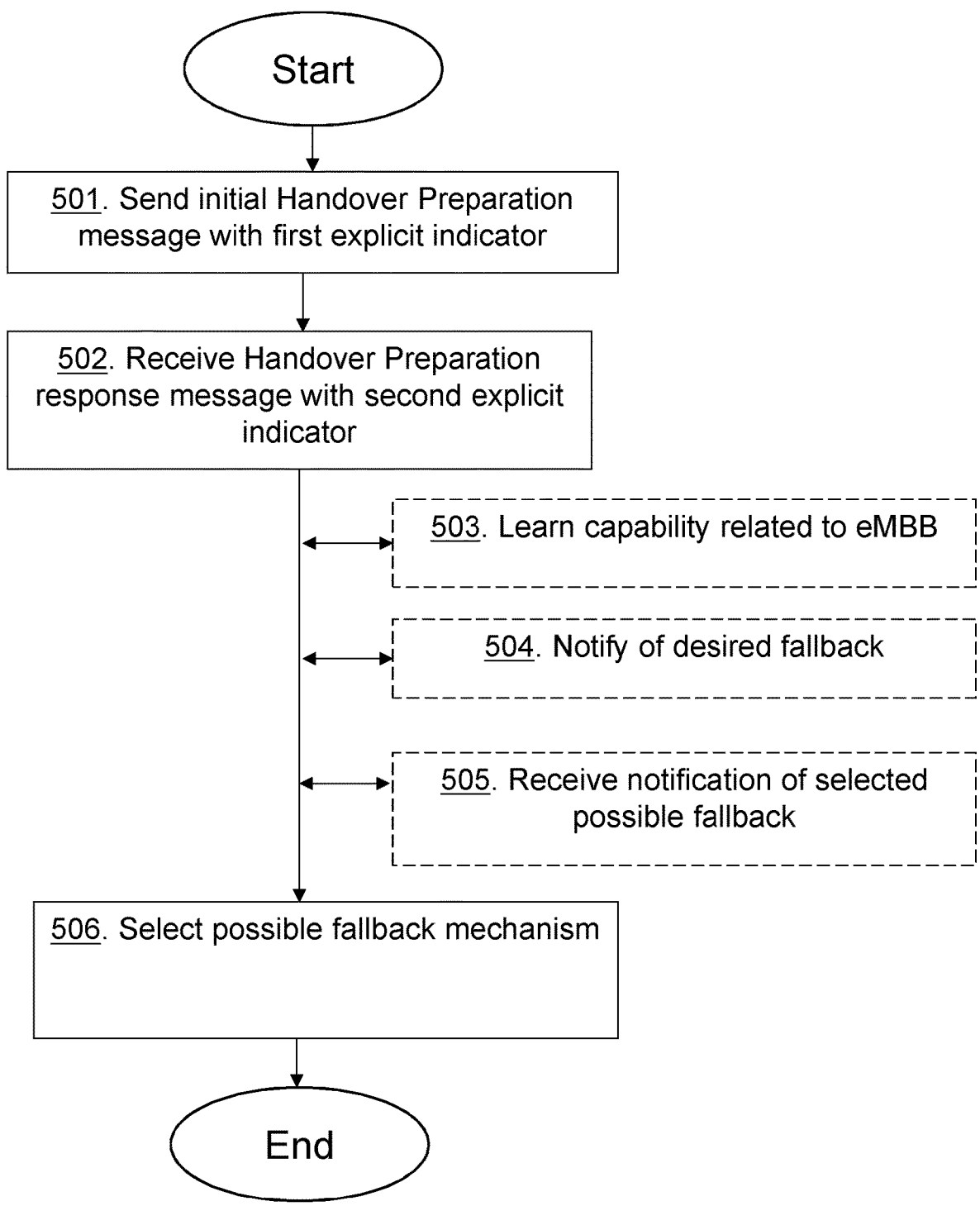
FIG. 5B is a flow chart illustrating a method performed in a source access node according to one embodiment herein.

Referring to action 503 in FIG. 5B, in one embodiment, dependent of the embodiments described above, the source access node 103 may learn about the target access node eMBB capability according to the response from the target access node 104.

If the source access node 103 receives a successful response without any additional eMBB information, it may deduce that the target access node 104 does not support eMBB.

If the source access node 103 receives a successful response with additional eMBB information, e.g. eMBB accepted or desired fallback, it may deduce that the target access node 104 supports eMBB.

If the source access node 103 receives a failure response with additional eMBB information, e.g. cause value=eMBB not accepted, it may deduce that the target access node 104 supports eMBB.

This information may be stored in the source access node 103 in order to take a decision concerning a subsequent handover to the same target access node 104 for the same or a different UE.

IV. Enhanced Make-Before-Break Handover Indicator in the RRC Handover

Command Being a Command Message Transferred to the Source Access Node 103

In one embodiment, in case the target access node 104 accepts the enhanced Make-Before-Request request from the source access node 103, the target access node 104 may insert the second indicator exemplified as an enhanced Make-Before-Break indicator in the RRC HandoverCommand message corresponding to the RRCConnectionReconfiguration message with an MobilityControlInfo IE in LTE and an RRCReconfiguration message with an reconfigurationWithSync IE in NR, to signal the UE that it should perform an enhanced Make-Before-Break handover.

An ASN.1 example for LTE is given below, where an enhancedMakeBeforeBreak-r16 IE (underlined) is added in the MobilityControlInfo contained in the RRCConnection-Reconfiguration message for LTE:

```
MobilityControlInfo ::=                SEQUENCE {
    targetPhysCellId                   PhysCellId,
    carrierFreq                        CarrierFreqEUTRA OPTIONAL, --
Cond HO-toEUTRA2
    carrierBandwidth                   CarrierBandwidthEUTRA OPTIONAL, --
Cond HO-toEUTRA
    additionalSpectrumEmission         AdditionalSpectrumEmission OPTIONAL, --
Cond HO-toEUTRA
    t304                               ENUMERATED {
                                           ms50, ms100, ms150, ms200, ms500, ms1000,
                                           ms2000, ms10000-v1310} ,
```

-continued

```
    newUE-Identity              C-RNTI,
    radioRescourceConfig-Common RadioRescurceConfig-Common,
    rach-ConfigDedicated        RACH-ConfigDedicated OPTIONAL, --
Need OP
    ...,
    [[ carrierFreq-v9e0         CarrierFreqEUTRA-v9e0 OPTIONAL --
Need ON
    ]],
    [[ drb-ContinueROHC-r11     ENUMERATED {true} OPTIONAL --
Cond HO
    ]],
    [[ mobilityControlInfoV2X-r14   MobilityControlInfoV2X-r14 OPTIONAL, --
Need ON
        handoverWithoutWT-Change-r14    ENUMERATED {keepLWA-Confiq, sendEndMarker}
    OPTIONAL, -- Cond HO
        makeBeforeBreak-r14             ENUMERATED {true} OPTIONAL, --
Need OR
        enhancedMakeBeforeBreak-r16     ENUMERATED {true} OPTIONAL, --
Need OR
        rach-Skip-r14                   RACH-Skip-r14 OPTIONAL, --
Need OR
        sameSFN-Indication-r14          ENUMERATED {true} OPTIONAL --
Cond HO-SFNsynced
    ]],
    [[
        mib-RepetitionStatus-r14        BOOLEAN OPTIONAL, --
Need OR
        schedulingInfoSIB1-BR-r14       INTEGER (0..31) OPTIONAL --
Cond HO-SFNsynced
    ]]
}
```

An example for NR is given below, where an enhancedMakeBeforeBreak-r16 IE (underlined) is added in the reconfigurationWithSync IE included in the RRCReconfiguration message in NR:

```
ReconfigurationWithSync ::=     SEQUENCE {
    spCellConfigCommon          ServingCellConfigCommon
OPTIONAL, -- Need M
    newUE-Identity              RNTI-Value,
    t304                        ENUMERATED {ms50, ms100, ms150, ms200,
ms500, ms1000, ms2000, ms10000},
    rach-ConfigDedicated        CHOICE {
        uplink                      RACH-ConfigDedicated,
        supplementaryUplink         RACH-ConfigDedicated
    }
OPTIONAL, -- Need N
    enhancedMakeBeforeBreak-r16     ENUMERATED {true} OPTIONAL,--
Need OR
    ...,
    [[
    smtc                        SSB-MTC
OPTIONAL -- Need S
    ]]
}
```

V. Fallback to Release-14 MBB when Target Access Node 104 does not Support eMBB.

In one embodiment the source access node 103 may combine the signaling method used for release-14 Make-Before-Break, i.e. adding makeBeforeBreak-r14 indicator, in RRC HandoverPreparation message, and the new indicator defined in action 501 i.e. the first explicit indicator. If the target access node 104 supports eMBB, and accepts the eMBB request, it will insert the RRC eMBB indicator in the RRC HandoverCommand message as defined in Action 605. If the target access node 104 supports eMBB, and rejects the eMBB request, it will insert the RRC release-14 MBB indicator in the RRC HandoverCommand message. If the target access node 104 does not support eMBB but supports release-14 MBB, it will insert the release-14 RRC MBB indicator in the RRC HandoverCommand message.

VI. Possible Source Access Node 103 and Target Access Node 104 Actions for Enhanced Make-Before-Break Preparation.

The embodiment herein is defining the possible source and target access nodes actions, related to network signaling, for the enhanced Make-Before-Break preparation. These actions are defined according to the different possible scenarios. The different possible scenarios are a combination of the following criteria/events:

Target access node eMBB support and decision upon reception of an eMBB request from the source access node 103:

I. Target access node 104 supports eMBB and accepts eMBB request;

II. Target access node 104 supports eMBB and rejects eMBB request;

III. Target access node 104 does not support eMBB.

Which node, i.e. source or target, takes the final decision on the fallback method to be used in case the target access node 104 rejects the eMBB request.

A. Fallback method is decided by target access node 104. Source access node 103 can always cancel afterwards, if fallback method is not suitable;

B. Fallback method is decided by the source access node 103 before the Handover Request;

C. Fallback method is decided by the source access node 103 after an Handover Preparation Failure received from the target access node 104.

Fallback method or other source/target access node decisions:

1) Fallback to legacy Handover;
2) Fallback to release-14 Make-Before-Break;
3) Handover is rejected;
4) Handover is cancelled.

By combining all the possible choices, the following behavior for source and target access nodes may be defined.

Target access node 104 supports eMBB and accepts eMBB request:

I. Target access node 104 adds the first explicit indicator e.g. the eMBB indicator in the RRC HandoverCommand message and adds an optional IE the second explicit indicator e.g. eMBB accepted, to the Handover Request Acknowledge, i.e. the target access node 104 may explicitly signal that eMBB have been accepted so the source access node 103 knows without having to check RRC HandoverCommand message. It may be needed to differentiate an "eMBB accepted" from an "eMBB not supported" event in some cases. Source access node 103 can learn that target access node 104 supports eMBB.

Target access node 104 supports eMBB and rejects eMBB request:

II.A.1. Target access node 104 does not add the eMBB indicator in the RRC HandoverCommand message and adds an optional IE e.g. fallback to legacy HO, to the Handover Request Acknowledge. The source access node 103 may learn that target access node 104 supports eMBB.

II.A.2. Target access node 104 adds the rel-14 MBB indicator in the RRC HandoverCommand message and adds an optional IE e.g. fallback to rel-14 MBB, to the Handover Request Acknowledge. Source access node 103 can learn that target access node 104 supports eMBB. It is assumed that a source access node 103 supporting eMBB is also supporting rel-14 MBB.

II.A.3. Target access node 104 may send legacy the Handover Preparation Failure message with a new cause value e.g. eMBB rejected. Source access node 103 may then learn that target access node 104 supports eMBB. Source access node 103 may try another Handover Request to the same node without eMBB indicator. Or try another target access node with or without eMBB.

II.A.4. N/A

II.B.1. Target access node 104 does not add the eMBB indicator in the RRC HandoverCommand message and adds an optional IE e.g. fallback to legacy HO to the Handover Request Acknowledge. Source access node 103 can learn that the target access node 104 supports eMBB.

II.B.2. Target access node 104 adds the rel-14 MBB indicator in the RRC HandoverCommand message and adds an optional IE e.g. fallback to rel-14 MBB, to the Handover Request Acknowledge. Source access node 103 may learn that target supports eMBB.

II.B.3. Target access node 104 sends an Handover Preparation Failure message with a new cause value e.g. eMBB rejected. Source access node 103 may learn that target access node 104 supports eMBB. Source access node 13 can try another target access node with or without eMBB.

II.B.4. Not needed. In that case source access node 103 should use actions described in II.B.3.

II.C.1. Target access node 104 sends an Handover Preparation Failure message with a new cause value e.g. eMBB rejected. Source access node 103 may learn that target access node 104 supports eMBB. Source access node 103 will send a new Handover Request without eMBB indicator.

II.C.2. Target access node 104 sends an Handover Preparation Failure message with a new cause value e.g. eMBB rejected. Source access node 103 may learn that target access node 104 supports eMBB. Source access node 103 will send a new Handover Request without rel-14 MBB indicator. Target access node 104 should be able to accept as rel-14 MBB does not need any specific action from target access node 104.

II.C.3. Target access node 104 sends an Handover Preparation Failure message with a new cause value e.g. eMBB rejected. Source access node 103 may learn that target access node 104 supports eMBB. Source access node 103 may try another target access node with or without eMBB.

II.C.4. N/A

Target access node 104 does not support eMBB.

III.A.1. Target access node 104 does not add the eMBB indicator in the RRC HandoverCommand message and does not add an optional IE to the Handover Request Acknowledge message. Source access node 103 may learn that target access node 104 does not support eMBB.

III.A.2. N/A unless the eMBB indicator in RRC is similar to the rel-14 MBB indicator. In that case the target access node 104 adds the rel-14 MBB indicator in the HO Command and does not add an optional IE to the HO Request Ack. Source access node 103 may learn that target does not support eMBB. If this use-case needs to be covered, signaling from source could combine 1 and 2 to cover cases when target supports eMBB.

III.A.3. N/A

III.A.4. N/A

III.B. N/A

III.C.1. Similar to III.A.1. This is the default actions from a target access node 104 not supporting eMBB.

III.C.2. Target access node 104 does not add the eMBB indicator in the RRC HandoverCommand message and does not add an optional IE to the Handover Request Acknowledge message. Source access node 103 may learn that target access node 104 does not support eMBB. Target access node 104 cancels the HO and sends a new Handover Request with rel-14 MBB indicator.

III.C.3. N/A

III.C.4. Target access node 104 does not add the eMBB indicator in the RRC HandoverCommand message eMBB. Source/target access node cancels the HO and can try another target access node with or without eMBB.

One alternative to the actions described above for a node not supporting eMBB is to send an Handover Request Failure with an existing cause value e.g. Abstract Syntax Error (Reject).

Figure 7A:
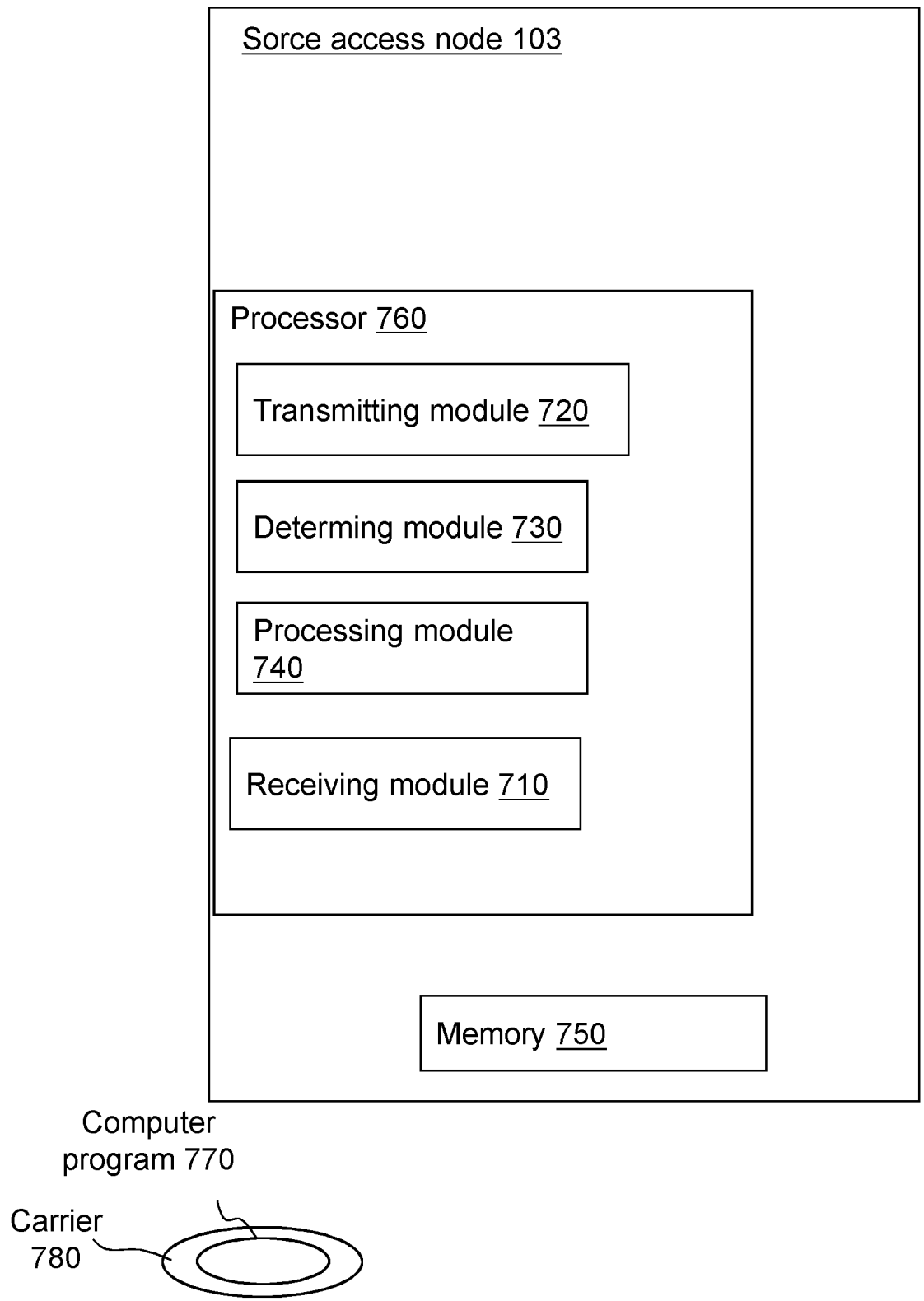
FIG. 7A is a schematic block diagram illustrating one embodiment of a source access node.

To perform the method in the source access node 103, the source access node 103 may comprise modules as shown in FIG. 7A. The source access node 103 may comprise a receiving module 710, a transmitting module 720, a determining module 730, a processing module 740, a memory 750 etc. The receiving module 710, transmitting module 720, determining module 730 and processing module 740 may be combined as one module, shown as processor 760.

The method according to embodiments herein may be implemented through one or more processors, such as the processor 760 in the source access node 103 together with computer program code for performing the functions and actions of the embodiments herein. The program code mentioned above may also be provided as a computer program product, for instance in the form of a data carrier 780 carrying computer program code 770, as shown in FIG. 7A, for performing the embodiments herein when being loaded into the source access node 103. One such carrier may be in the form of a CD ROM disc. It is however feasible with other data carriers such as a memory stick. The computer program code may furthermore be provided as pure program code on a server or a cloud and downloaded to the source access node 103.

The memory 750 in the source access node 103 may comprise one or more memory units and may be arranged to be used to store received information, measurements, data, configurations and applications to perform the method herein when being executed in the source access node 103.

The source access node 103, the processor 760 or the transmitting module 720 is configured to send to the target access node 104, the initial handover preparation message with the first explicit indicator for the target access node 104 to request an enhanced Make-Before-Break Handover.

The source access node 103, the processor 760 or the receiving module 710 is configured to receive the handover preparation response message from the target access node 104, with the second explicit indicator accepting or rejecting the requested enhanced Make-Before-Break Handover.

The source access node 103, the processor 760 or the determining module 730 is configured to select the possible fallback mechanism, upon reception of the handover preparation response message from the target access node 104 indicating rejection or no support of enhanced Make-Before-Break Handover.

The source access node 103, the processor 760 or the processing module 740 may be configured to notify the target access node 104 of the desired fallback in case of failure or reject of the requested enhanced Make-Before-Break Handover.

The source access node 103, the processor 760 or the processing module 740 may be configured to learn, from the handover preparation response message, the capability of the target access node 104 related to enhanced Make-Before-Break handover. The capability of the target access node 104 may be learned based on successful responses or failure responses of requested enhanced Make-Before-Break handovers. The source access node 103, the processor 760 or the determining module 730 may be configured to select the possible fallback mechanism taking the desired fallback into account and/or the learned capability of the target access node 104.

The source access node 103, the processor 760 or the determining module 730 may be configured to notify the target access node 104 of the desired fallback, and wherein the first explicit indicator for Enhanced Make-Before-Break handover and an indicator for the desired fallback mechanism is combined in a single Information Element in the initial Handover Preparation message.

The source access node 103, the processor 760 or the transmitting module 720 may be configured to add the first explicit indication as an additional information in the initial handover preparation message.

The first explicit indication may be included in a RRC context signalled from the source access node to the target access node. The first explicit indication may be added in a handover request message.

The possible and/or the desired fallback may comprise one or more of the following: a fallback to legacy handover; a fallback to release-14 MBB handover; and a rejection of the handover request.

The source access node 103, the processor 760 or the receiving module 710 may be configured to receive the notification from the target access node 104 of a selected possible fallback mechanism in case of rejection of the enhanced Make-Before-Break Handover request.

The source access node 103, the processor 760 or the determining module 730 may be configured to select the possible fallback mechanism by taking the notification into account.

Figure 7B:
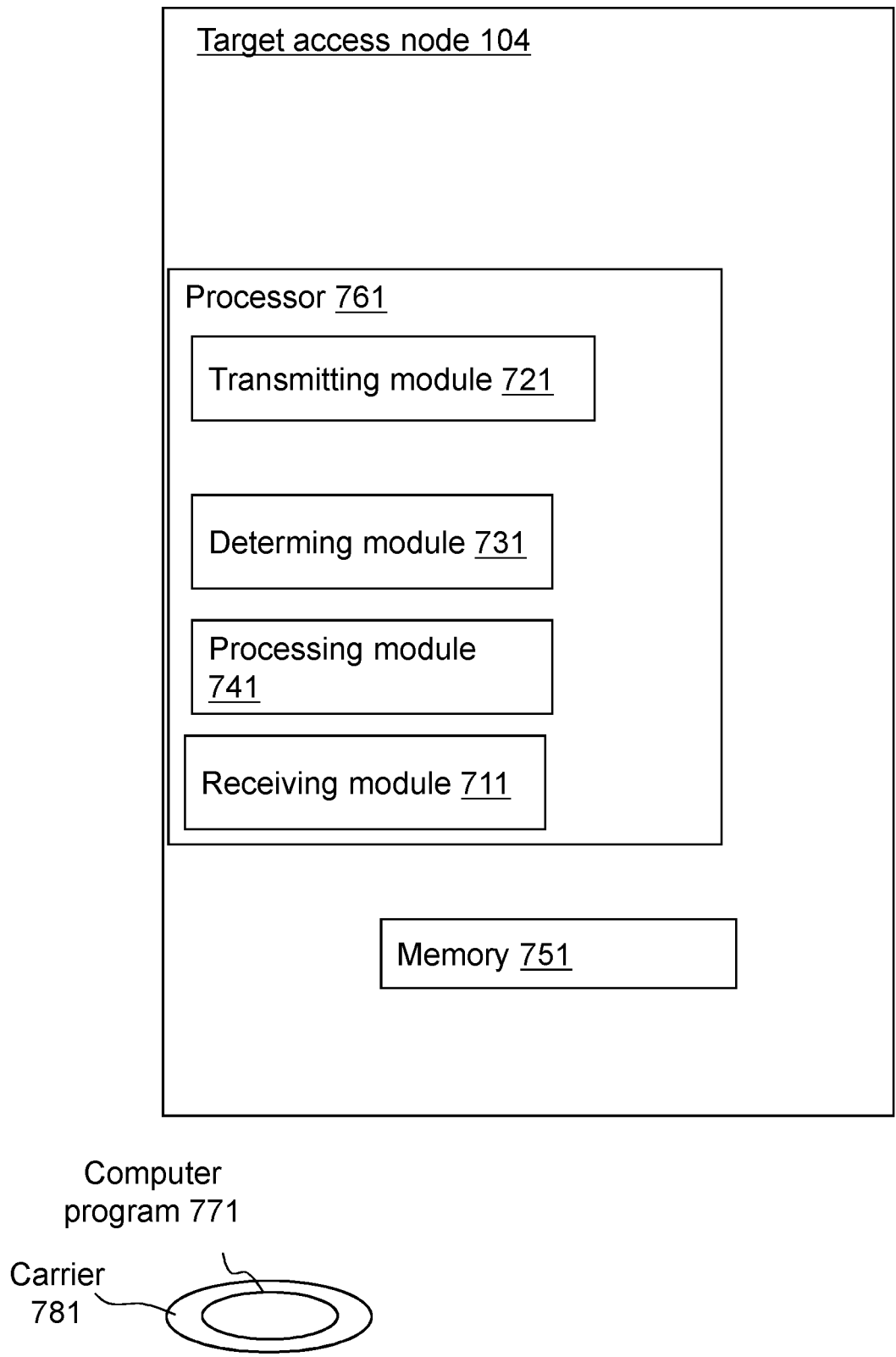
FIG. 7B is a schematic block diagram illustrating one embodiment of a target access node.

To perform the method in the target access node 104, the target access node 104 may comprise modules as shown in FIG. 7B. The target access node 104 may comprise a receiving module 711, a transmitting module 721, a determining module 731, a processing module 741, a memory 751 etc. The receiving module 711, transmitting module 721, determining module 731 and processing module 741 may be combined as one module, shown as processor 761.

The target access node 104, the processor 761 and/or the receiving module 711 is configured to receive the initial handover preparation message with the first explicit indicator from the source access node 103 requesting the enhanced Make-Before-Break Handover.

The target access node 104, the processor 761 and/or the transmitting module 721 is configured to respond to the initial handover preparation message sent by the source access node 103, with the handover preparation response message with the second explicit indicator accepting or rejecting the enhanced Make-Before-Break Handover request.

The target access node 104, the processor 761 and/or the determining module 731 may be configured to select the possible fallback mechanism in case of failure or rejection of the enhanced Make-Before-Break Handover.

The target access node 104, the processor 761 and/or the transmitting module 721 may be configured to notify the source access node 103 of the selected possible fallback mechanism in case of failure or rejection of the enhanced Make-Before-Break Handover request.

The target access node 104, the processor 761 and/or the transmitting module 721 may be configured to respond with the handover preparation response message to the source access node 103 with the second indicator rejecting the enhanced Make Before Break Handover request and the indicator of selected possible fallback method.

The target access node 104, the processor 761 and/or the transmitting module 721 may be configured to respond by inserting the explicit enhanced Make-Before-Break Handover indicator in the RRC HandoverCommand message transferred to the source access node 103.

The target access node 104, the processor 761 and/or the receiving module 711 may be configured to receive the notification from the source access node 103 of the desired fallback in case of failure or reject of the requested enhanced Make-Before-Break Handover. The target access node 104, the processor 761 and/or the determining module 731 may be configured to select the possible fallback mechanism taking the received notification into account.

The method according to embodiments herein may be implemented through one or more processors, such as the processor 761 in the target access node 104 together with computer program code for performing the functions and actions of the embodiments herein. The program code mentioned above may also be provided as a computer program product, for instance in the form of a data carrier 781 carrying computer program code 771, as shown in FIG. 7B, for performing the embodiments herein when being loaded into the target access node 104. One such carrier may be in the form of a CD ROM disc. It is however feasible with other data carriers such as a memory stick. The computer program code may furthermore be provided as pure program code on a server or a cloud and downloaded to the target access node 104.

The memory 751 in the target access node 104 may comprise one or more memory units and may be arranged to be used to store received information, measurements, data, configurations and applications to perform the method herein when being executed in the target access node 104.

Below are some embodiments described.

Embodiment 1: A method in a source access node to perform handover of a UE to a target access node comprising:
sending an initial Handover Preparation message with an indicator for the target access node to request an enhanced Make-Before-Break Handover;
notifying the target access node of the desired fallback in case of rejection of the enhanced Make-Before-Break Handover request;
receiving a Handover Preparation response message from the target access node, with an indicator accepting or rejecting the enhanced Make-Before-Break Handover request;
in response to receiving the Handover Preparation response message, taking a decision about the possible fallback method upon reception of the target access node rejecting enhanced Make-Before-Break Handover.

Embodiment 2: according to the Embodiment 1, wherein the source access node learns the target access node enhanced Make-Before-Break capability from the target response message to the enhanced Make-Before-Break Handover request.

Group B Embodiments

Embodiment 3: A method in a target access node to perform handover of a UE from a source access node comprising:
receiving an initial Handover Preparation message with an indicator from the source access node requesting an enhanced Make-Before-Break Handover;
responding to the initial Handover Preparation message sent by the source access node, with an indicator accepting or rejecting the enhanced Make-Before-Break Handover request;
selecting a possible fallback method in case of rejection of the enhanced Make-Before-Break Handover;
notifying the source access node of the selected fallback method in case of rejection of the enhanced Make-Before-Break Handover request;
inserting an explicit enhanced Make-Before-Break Handover indicator in the RRC HandoverCommand message transferred to the source access node, in order to notify the U E.

Figure 1:
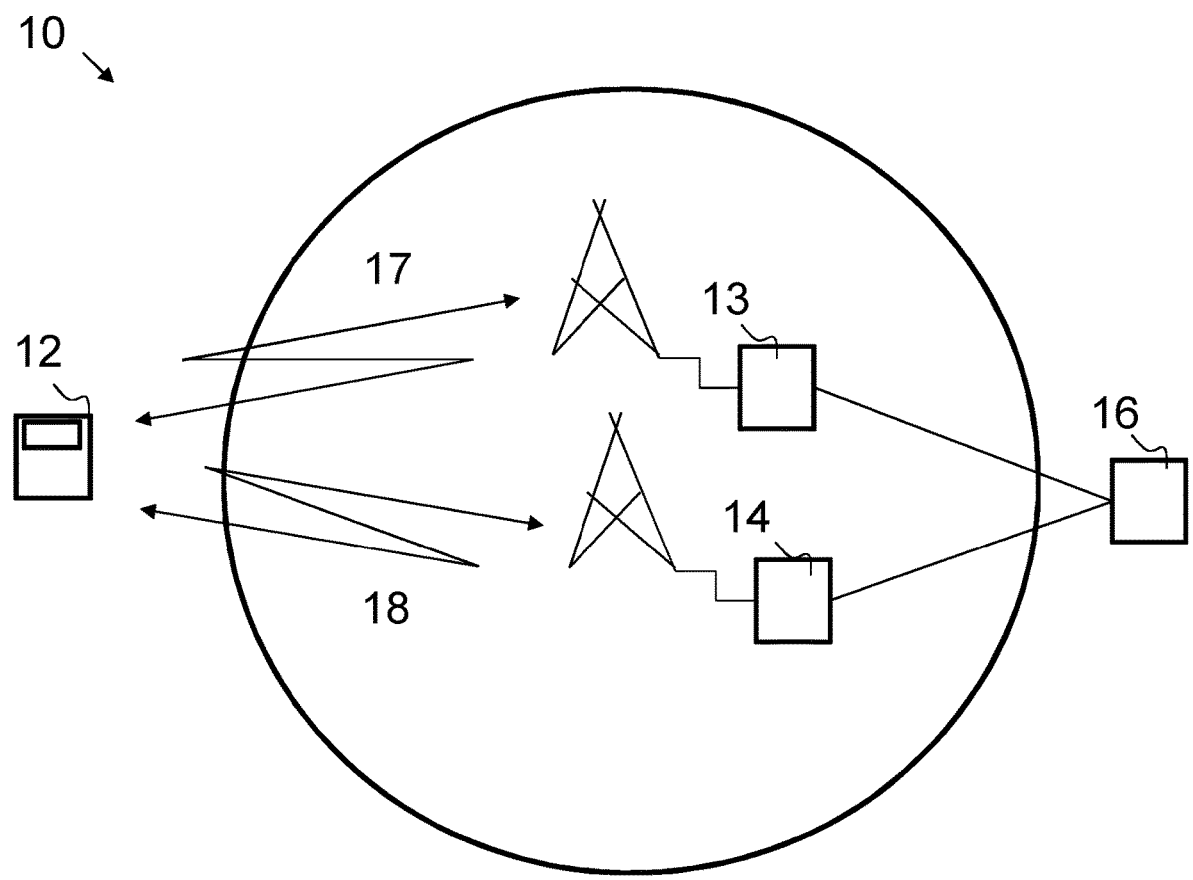
FIG. 1 illustrates a wireless communication network according to prior art.
Figure 2:
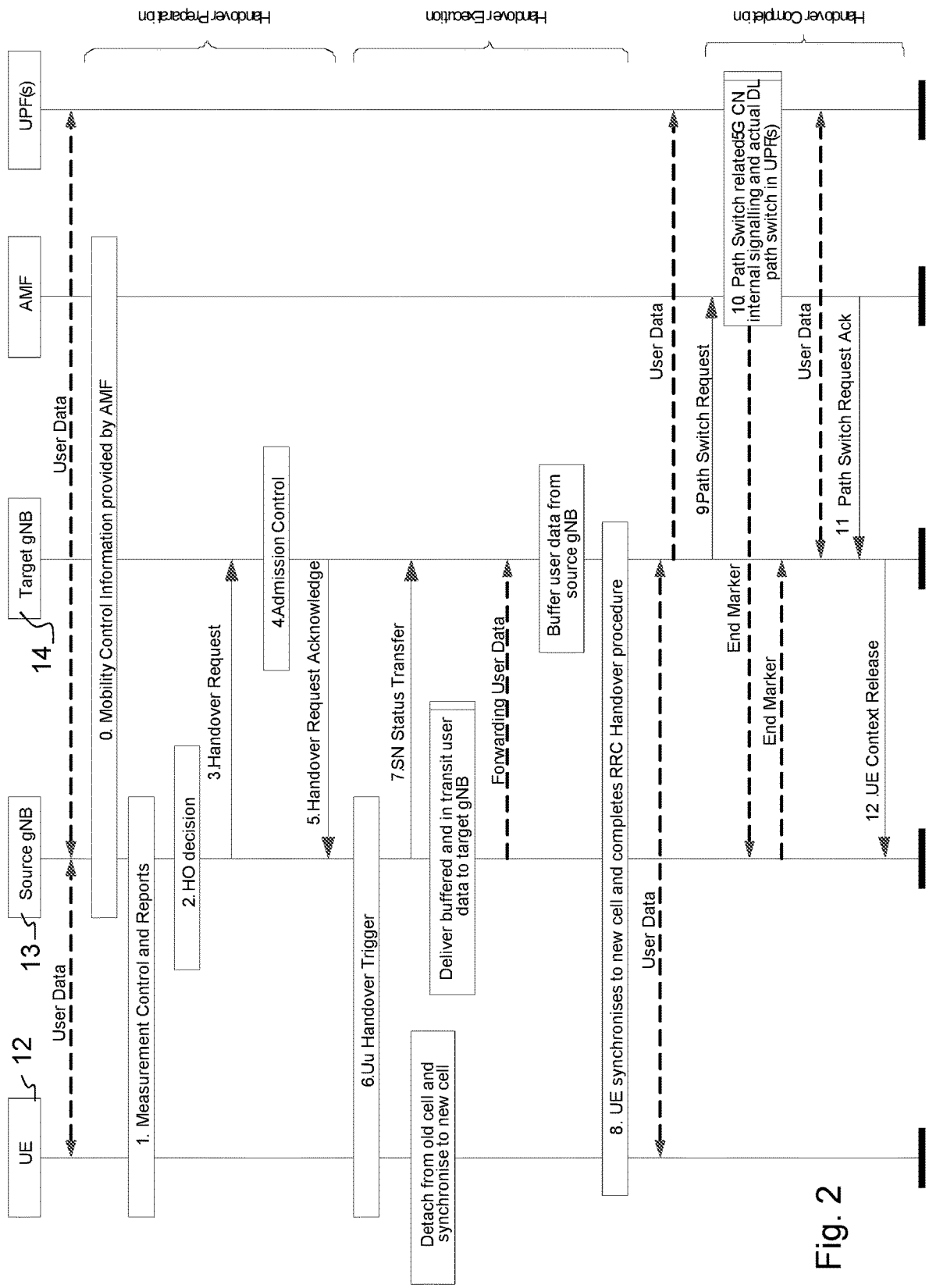
FIG. 2 illustrates handover signalling in 5G/NR.
Figure 3:
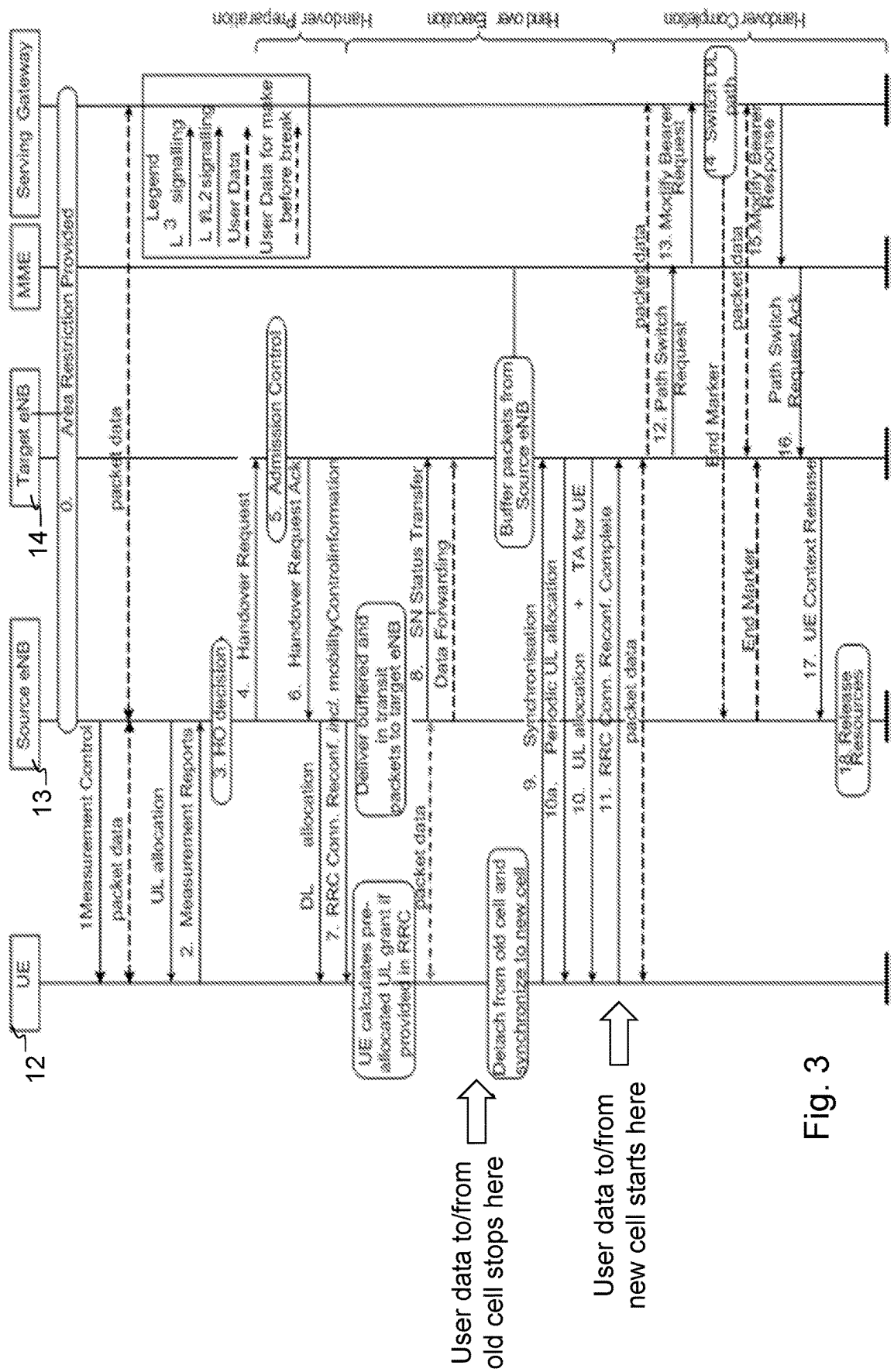
FIG. 3 illustrates Make-before-break signalling LTE.
Figure 4:
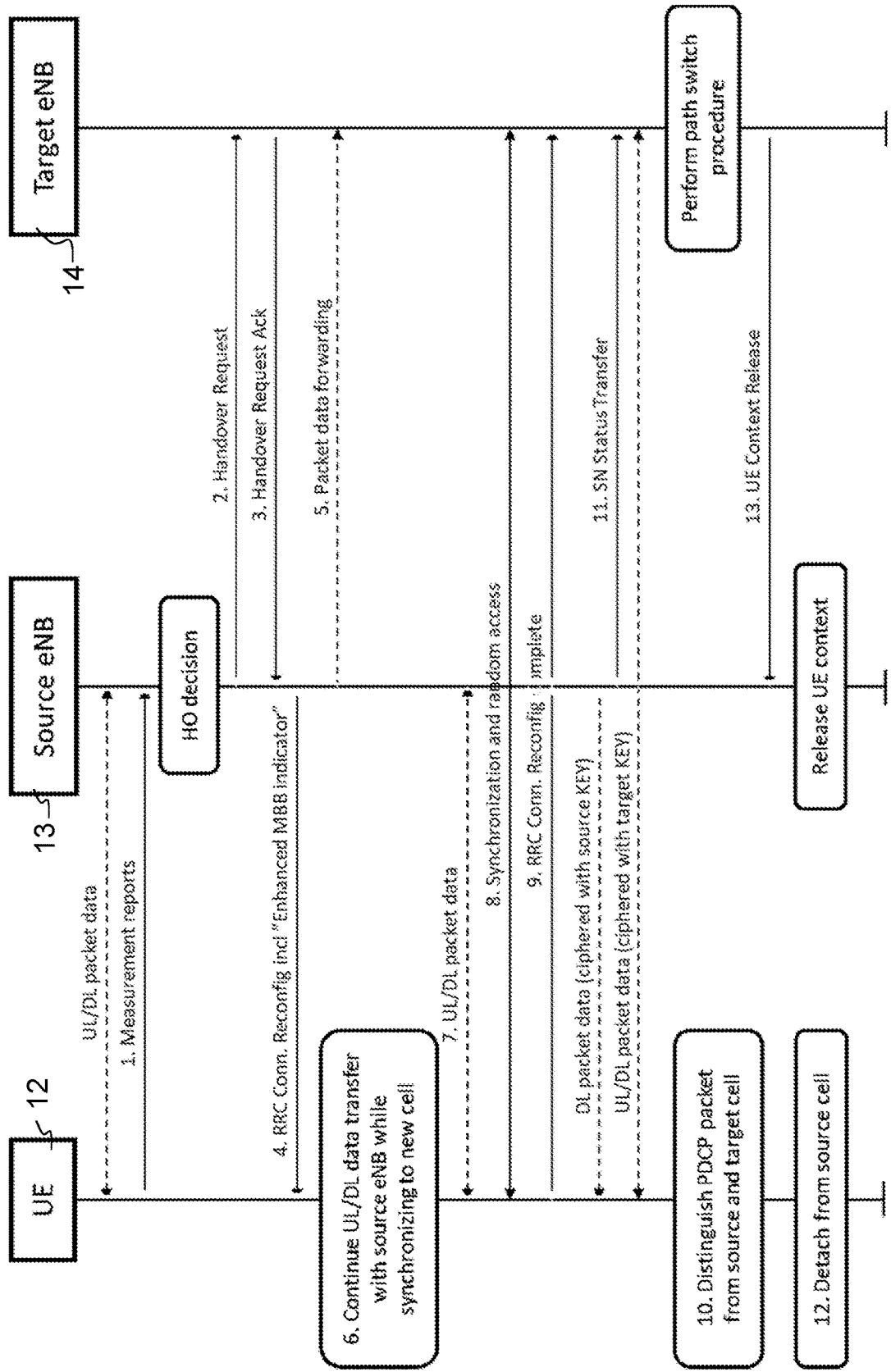
FIG. 4 illustrates a proposed Enhanced MBB procedure to support 0 ms HO interruption time in LTE Rel-16.

In case the texts in FIGS. 2-4 are too small and blurry to read, references are given below:
FIG. 2: From 3GPP TS 38.300 v15.2.0, FIG. 9.2.3.2.1-1
FIG. 3: From 3GPP TS 36.300 v14.8.0, FIG. 10.1.2.1.1-1
FIG. 4: From R2-1817396, Enhancements to Make-Before-Break, Ericsson, 3GPP TSG-RAN WG2 #104, Spokane, USA, 12-16 Nov. 2018.

At least some of the following abbreviations may be used in this disclosure. If there is an inconsistency between abbreviations, preference should be given to how it is used above. If listed multiple times below, the first listing should be preferred over any subsequent listing(s).

| Abbreviation | Explanation |
| --- | --- |
| 5GS | 5G System |
| 5GC | 5G Core network |
| AMF | Access and Mobility Management Function |
| CHO | Conditional Handover |
| C-RNTI | Cell RNTI |
| DL | Downlink |
| eNB | Evolved Node B |
| eMBB | Enhanced Make-before-break |
| E-UTRAN | Evolved Universal Terrestrial Access Network |
| EPC | Evolved Packet Core network |
| gNB | 5G Node B |
| HO | Handover |
| IE | Information Element |
| LTE | Long-term Evolution |
| MBB | Make-before-break |
| NCC | Next Hop Chaining Counter |
| NG-RAN | Next Generation Radio Access Network |
| NR | New Radio |
| PDCP | Packet Data Convergence Protocol |
| RA | Random Access |
| RAR | Random Access Response |
| RAT | Radio Access Technology |
| RNTI | Radio Network Temporary Identifier |
| RRC | Radio Resource Control |
| Rx | Receive |
| SDU | Service Data Unit |
| SN | Sequence Number |
| Tx | Transmit |
| UE | User Equipment |
| UL | Uplink |
| UPF | User Plane Function |

The invention claimed is:

1. A method performed by a source access node relating to handover of a user equipment, UE, the method comprising:
sending to a target access node, an initial handover preparation message with a first explicit indicator for the target access node to request an enhanced Make-Before-Break Handover;
receiving an handover preparation response message from the target access node, with a second explicit indicator accepting or rejecting the requested enhanced Make-Before-Break Handover; and
selecting a possible fallback mechanism, upon reception of the handover preparation response message from the target access node indicating one of rejection and no support of enhanced Make-Before-Break Handover.

2. The method according to claim 1, further comprising:
notifying the target access node of a desired fallback in case of failure or reject of the requested enhanced Make-Before-Break Handover.

3. The method according to claim 1, further comprising:
learning, from the handover preparation response message, a capability of the target access node related to enhanced Make-Before-Break handover.

4. The method according to the claim 3, wherein the capability of the target access node is learned based on successful responses or failure responses of requested enhanced Make-Before-Break handovers.

5. The method according to claim 2, wherein selecting the possible fallback mechanism takes into account at least one of the desired fallback and the learned capability of the target access node.

6. The method according to claim 2, wherein the source access node notifies the target access node of the desired fallback, and wherein the first explicit indicator for Enhanced Make-Before-Break handover and an indicator for the desired fallback mechanism is combined in a single Information Element in the initial Handover Preparation message.

7. The method according to claim 1, wherein the first explicit indication is added as an additional information in the initial handover preparation message send from source to target.

8. The method according to claim 1, wherein the first explicit indication is included in an radio resource control, RRC, context signaled from source to target.

9. The method according to claim 1, wherein the first explicit indication is added in a handover request message.

10. The method according to claim 1, wherein at least one of the possible and the desired fallback comprises one or more of the following: a fallback to legacy handover; a fallback to release-14 Make-Before-Break handover; and a rejection of the handover request.

11. The method according to claim 1, further comprising:
receiving a notification from the target access node of a selected possible fallback mechanism in case of rejection of the enhanced Make-Before-Break Handover request.

12. The method according to the claim 11, wherein selecting the possible fallback mechanism takes the notification into account.

13. A method performed by a target access node relating to handover of a user equipment, UE, from a source access node to the target access node, the method comprising:
receiving an initial handover preparation message with a first explicit indicator from the source access node requesting an enhanced Make-Before-Break Handover; and
responding to the initial handover preparation message sent by the source access node, with a handover preparation response message with a second explicit indicator accepting or rejecting the enhanced Make-Before-Break Handover request.

14. The method according to claim 13, further comprising:
selecting a possible fallback mechanism in case of one of failure and rejection of the enhanced Make-Before-Break Handover; and
notifying the source access node of the selected possible fallback mechanism in case of one of failure and rejection of the enhanced Make-Before-Break Handover request.

15. The method according to claim 14, responding with a handover preparation response message to the source access node with the second indicator rejecting the enhanced Make Before Break Handover request and an indicator of selected possible fallback method.

16. The method according to claim 13, wherein responding comprises inserting an explicit enhanced Make-Before-Break Handover indicator in the RRC HandoverCommand message transferred to the source access node.

17. The method according to claim 13, further comprising:
receiving a notification from the source access node of a desired fallback in case of one of failure and rejection of the requested enhanced Make-Before-Break Handover.

18. The method according to claim 17, wherein selecting the possible fallback mechanism takes the received notification into account.

19. A source access node for handling handover of a user equipment, UE, the source access node being configured to:
send to a target access node, an initial handover preparation message with a first explicit indicator for the target access node to request an enhanced Make-Before-Break Handover;
receive an handover preparation response message from the target access node, with a second explicit indicator accepting or rejecting the requested enhanced Make-Before-Break Handover;
select a possible fallback mechanism, upon reception of the handover preparation response message from the target access node indicating one of rejection and no support of enhanced Make-Before-Break Handover.

20. The source access node according to claim 19, wherein the source access node is further configured to:
notify the target access node of a desired fallback in case of one of failure and rejection of the requested enhanced Make-Before-Break Handover.

21. The source access node according to claim 19, wherein the source access node is further configured to:
learn, from the handover preparation response message, a capability of the target access node related to enhanced Make-Before-Break handover.

22. The source access node according to the claim 21, wherein the capability of the target access node is learned based on successful responses or failure responses of requested enhanced Make-Before-Break handovers.

23. The source access node according to the claim 20, wherein the source access node is configured to select the possible fallback mechanism taking into account at least one of the desired fallback and the learned capability of the target access node.

24. The source access node according to claim 22, wherein the source access node is configured to notify the target access node of the desired fallback, and wherein the first explicit indicator for Enhanced Make-Before-Break handover and an indicator for the desired fallback mechanism is combined in a single Information Element in the initial Handover Preparation message.

25. The source access node according to claim 19, wherein the source access node is configured to add the first explicit indication as an additional information in the initial handover preparation message.

26. A target access node for handling handover of a user equipment, UE, from a source access node to the target access node, the target access node being configured to:
receive an initial handover preparation message with a first explicit indicator from the source access node requesting an enhanced Make-Before-Break Handover; and
respond to the initial handover preparation message sent by the source access node, with a handover preparation response message with a second explicit indicator accepting or rejecting the enhanced Make-Before-Break Handover request.

* * * * *

UNITED STATES PATENT AND TRADEMARK OFFICE
CERTIFICATE OF CORRECTION

| | |
|---|---|
| PATENT NO. | : 11,818,611 B2 |
| APPLICATION NO. | : 17/427821 |
| DATED | : November 14, 2023 |
| INVENTOR(S) | : Muller et al. |

It is certified that error appears in the above-identified patent and that said Letters Patent is hereby corrected as shown below:

In the Specification

In Column 1, Line 55, delete "(SGVV)." and insert -- (SGW). --, therefor.

In Column 1, Line 59, delete "network (EPC)." and insert -- (EPC) network. --, therefor.

In Column 2, Line 3, delete "Network (5GC)." and insert -- (5GC) Network. --, therefor.

In Column 3, Line 3, delete "bearer" and insert -- bearer 1 --, therefor.

In Column 15, Line 52, delete "Handover (eMBB)" and insert -- (eMBB) Handover --, therefor.

In Column 38, Line 20, delete "E-UTRAN Evolved Universal Terrestrial Access Network" and insert -- E-UTRAN Evolved Universal Terrestrial Radio Access Network --, therefor.

In the Claims

In Column 39, Line 14, in Claim 7, delete "send" and insert -- sent --, therefor.

Signed and Sealed this
Sixteenth Day of April, 2024

Katherine Kelly Vidal
*Director of the United States Patent and Trademark Office*